US009436726B2

(12) United States Patent
Matthews

(10) Patent No.: US 9,436,726 B2
(45) Date of Patent: Sep. 6, 2016

(54) SYSTEM, METHOD AND COMPUTER PROGRAM PRODUCT FOR A BEHAVIORAL DATABASE PROVIDING QUANTITATIVE ANALYSIS OF CROSS BORDER POLICY PROCESS AND RELATED SEARCH CAPABILITIES

(75) Inventor: Barbara C. Matthews, Alexandria, VA (US)

(73) Assignee: BCM International Regulatory Analytics LLC, Washington, DC (US)

( * ) Notice: Subject to any disclaimer, the term of this patent is extended or adjusted under 35 U.S.C. 154(b) by 0 days.

(21) Appl. No.: 13/531,496

(22) Filed: Jun. 22, 2012

(65) Prior Publication Data

US 2013/0159289 A1   Jun. 20, 2013

Related U.S. Application Data

(60) Provisional application No. 61/500,299, filed on Jun. 23, 2011.

(51) Int. Cl.
*G06F 7/00* (2006.01)
*G06F 17/30* (2006.01)
*G06Q 10/06* (2012.01)
*G06Q 50/18* (2012.01)
*G06Q 50/26* (2012.01)

(52) U.S. Cl.
CPC ... *G06F 17/30424* (2013.01); *G06F 17/30696* (2013.01); *G06Q 10/0635* (2013.01); *G06Q 50/18* (2013.01); *G06Q 50/26* (2013.01)

(58) Field of Classification Search
None
See application file for complete search history.

(56) References Cited

U.S. PATENT DOCUMENTS

| 6,021,409 A | 2/2000 | Burrows |
| 6,029,165 A | 2/2000 | Gable |
| 6,175,830 B1 | 1/2001 | Maynard |
| 6,178,419 B1 | 1/2001 | Legh-Smith et al. |
| 6,289,342 B1 | 9/2001 | Lawrence et al. |
| 6,304,864 B1 | 10/2001 | Liddy et al. |
| 6,349,307 B1 | 2/2002 | Chen |
| 6,363,378 B1 | 3/2002 | Conklin et al. |

(Continued)

OTHER PUBLICATIONS

Tekusova, Tatiana; Voss, Viktor; Kohlhammer, Joern, "Semantic Search and Visualization of Time-Series Data," Proceedings of I-KNOW '08 & I-MEDIA '08, Graz, Austria, Sep. 3-5, 2008.

*Primary Examiner* — Jason Liao
*Assistant Examiner* — David T Brooks
(74) *Attorney, Agent, or Firm* — ATFirm PLLC; Ralph P. Albrecht

(57) ABSTRACT

A system, method, or computer program product for translating non-quantitative, text-based data into a quantitative risk management tool(s) including: receiving, by a computer processor(s), non-quantitative data relating to cross-border public policy; receiving, by the processor(s), at least one tag relating to said non-quantitative data; storing, by the processor(s), said non-quantitative data and said at least one tag in a database; and providing, by the processor(s), quantitative risk management tools designed to provide customized, automatic daily graphical illustrations of policy activity levels on a cross-border basis using concepts and other meta-tagging tools to generate graphs. Tools may mining data to extract quantitative and graphical information from stored, tagged non-quantitative data and may semantically search those documents as well as assess correlations and covariances of cross-border policy processes, and deliver quantitative and/or graphical output results.

31 Claims, 11 Drawing Sheets

(56) References Cited

U.S. PATENT DOCUMENTS

| | | |
|---|---|---|
| 6,430,558 B1 | 8/2002 | Delano |
| 6,584,468 B1 | 6/2003 | Gabriel et al. |
| 6,629,138 B1 | 9/2003 | Lambert et al. |
| 6,636,848 B1 | 10/2003 | Aridor et al. |
| 6,647,383 B1 | 11/2003 | August et al. |
| 6,665,659 B1 | 12/2003 | Logan |
| 6,963,867 B2 | 11/2005 | Ford et al. |
| 6,965,900 B2 | 11/2005 | Srinivasa et al. |
| 7,096,220 B1 | 8/2006 | Seibel et al. |
| 7,117,199 B2 | 10/2006 | Frank et al. |
| 7,599,911 B2 | 10/2009 | Manber et al. |
| 7,949,648 B2 | 5/2011 | Jacobsen et al. |
| 2001/0037324 A1 | 11/2001 | Agrawal et al. |
| 2002/0016786 A1 | 2/2002 | Pitkow et al. |
| 2002/0129014 A1 | 9/2002 | Kim et al. |
| 2003/0046311 A1 | 3/2003 | Baidya et al. |
| 2003/0061232 A1 | 3/2003 | Patterson |
| 2003/0135445 A1* | 7/2003 | Herz et al. .......... 705/37 |
| 2003/0172050 A1 | 9/2003 | Decime et al. |
| 2004/0073534 A1* | 4/2004 | Robson .......... 707/1 |
| 2004/0153456 A1* | 8/2004 | Charnock et al. .......... 707/10 |
| 2004/0181389 A1 | 9/2004 | Bourigault et al. |
| 2006/0004731 A1 | 1/2006 | Seibel et al. |
| 2007/0050149 A1* | 3/2007 | Raskin .......... 702/19 |
| 2007/0094219 A1* | 4/2007 | Kipersztok .......... 706/52 |
| 2008/0027692 A1* | 1/2008 | Fables et al. .......... 703/6 |
| 2009/0216747 A1* | 8/2009 | Li et al. .......... 707/5 |
| 2010/0114899 A1* | 5/2010 | Guha et al. .......... 707/741 |
| 2010/0179930 A1* | 7/2010 | Teller et al. .......... 706/12 |
| 2011/0208681 A1* | 8/2011 | Kuecuekyan .......... 706/21 |

* cited by examiner

SYSTEM, METHOD AND COMPUTER PROGRAM PRODUCT FOR A BEHAVIORAL DATABASE PROVIDING QUANTITATIVE ANALYSIS OF CROSS BORDER POLICY PROCESS AND RELATED SEARCH CAPABILITIES

CROSS-REFERENCE TO RELATED APPLICATIONS

The present invention is a nonprovisional U.S. patent application of, and claims the benefit under 35 USC 119(e) of U.S. Provisional Patent Application Ser. No. 61/500,299, confirmation no. 7467, filed Jun. 23, 2011, entitled "System, Method and Computer Program Product for Providing Improved Search," of common assignee to the claimed invention, the contents of which is incorporated herein by reference in its entirety.

BACKGROUND OF THE INVENTION

1. Field of the Invention

The present invention relates to systems and methods for providing search engines and databases of documents.

2. Discussion of the Related Art

Conventionally, various systems have existed for receiving search queries and providing search results. Conventional databases are collections of data, which may be queried using, natural language or Boolean search terms, to find results meeting the query.

Conventional databases deliver search results in a list form, without providing the user with automatic quantitative analysis of how searched documents relate to each other or how activity levels among documents compare with each other across subject matter areas.

Internet search engines allow a user to search vast hyperlinked data on the World Wide Web. Unfortunately, not all data is accessible by such search engines. Also, conventionally, data may be too vast in a particular area to provide useful results to a user performing a search.

Metadata is data about data. Metatags are one way of identifying data characteristics about data.

Semantic search uses semantics, the science of meaning of language, in order to obtain highly relevant search results. Semantic search seeks to improve search accuracy by understanding an intent of a searcher and contextual meaning of terms as the terms appear in a searchable dataspace in order to generate more relevant search results. Semantic search permits dynamic and efficient processes for identifying where key phrases exist within documents, but conventional semantic search fails to provide sufficient quantitative or qualitative analysis of results in many domains. For example, conventionally, public policy processes are perceived as being non-quantifiable.

What is needed is an improved system that overcomes shortcomings of conventional text-based search systems.

SUMMARY OF EXEMPLARY EMBODIMENTS OF INVENTION

Various exemplary embodiments of a system, method and computer program product for providing a platform for receiving search queries and providing search results according to various exemplary embodiments of the present invention, are set forth.

A system, method, or computer program product for translating non-quantitative cross-border public policy text or other document(s) into at least one quantitative risk management tool that may include, in an exemplary embodiment: receiving, by at least one computer processor, non-quantitative data relating to public policy (such as, e.g., but not limited to, cross-border public policy such as, e.g., but not limited to, financial policy, regulatory policy, financial regulator policy, health policy, agricultural policy, trade policy, development policy, intellectual property rights policy, and/or economic policy, international organizational policy, treaties, etc.); receiving, by the at least one computer processor, at least one tag relating to said non-quantitative data; and storing, by the at least one computer processor, said non-quantitative data and said at least one tag in a database. The exemplary method may further provide, by the at least one computer processor, quantitative risk management tools designed to provide customized, automatic (e.g., daily) graphical illustrations of policy activity levels on a cross-border basis using concepts and/or other metatagging tools to generate exemplary graphs. The exemplary method may also provide data mining tools, which may extract quantitative and graphical information from stored, tagged non-quantitative data. The exemplary method may also provide, by the at least one computer processor, a capability to assess historical and/or future time series, as well as correlation and/or covariance data for exemplary inter-linked, cross-border public policy processes.

An exemplary embodiment of the invention may include, the method, wherein the method may further include: receiving, by the at least one computer processor, a query regarding said non-quantitative data; searching, by the at least one computer processor, said database based on said query; and providing, by the at least one computer processor, (e.g., storing, displaying, outputting) search results of said non-quantitative data meeting displayed in a graphical, quantitative manner on an automatic basis at least once a day reflecting activity levels on pre-determined issue areas of interest.

An exemplary embodiment of the invention may include where the receiving said query may include at least one of: receiving, by the at least one computer processor, a web based query; or receiving, by the at least one computer processor, a selection of a portion of a graphical user interface.

An exemplary embodiment of the invention may include, the method, where the method may include: the providing said search results, which may include: generating, by the at least one computer processor, at least one customized graph.

An exemplary embodiment of the invention may include, the method, wherein the method may include where the generating at least one customized graph may include at least one of: generating, by the at least one computer processor, at least one customized bar graph; generating, by the at least one computer processor, at least one customized pie chart graph; generating, by the at least one computer processor, at least one customized line graph or time series pairing important policy-making meetings and/or financial contract expiry dates with selected issue-specific cross-border public policy processes and related research and speeches; generating, by the at least one computer processor, at least one customized relationship map graph; or generating, by the at least one computer processor, at least one customized graph comprising a plurality of portions (e.g., but not limited to, segments, bars, regions, areas, etc.), each of said plurality of portions hyperlinked to said non-quantitative data.

An exemplary embodiment of the invention may include, the method, where the method may include: where the receiving the non-quantitative data may include at least one of: receiving, by the at least one computer processor, a portable document format (pdf) document or other document issued by a government ministry or an international or multiple jurisdiction institution in non-editable final form regarding cross-border regulatory, financial and/or economic policy formation; receiving, by the at least one computer processor, a communiqué document; a treaty or other international agreement; receiving, by the at least one computer processor, a publicly available draft legislation document; receiving, by the at least one computer processor, a final legislation document; receiving, by the at least one computer processor, a publicly available draft regulation document; receiving, by the at least one computer processor, a publicly available official sector speech document; receiving, by the at least one computer processor, a publicly available official sector research document issued by national, supranational, and/or international official sector organizations; receiving, by the at least one computer processor, a confidential client analysis prepared for an individual client and visible only to the client for whom it was prepared; receiving, by the at least one computer processor, a publication published on a subscription basis, displayed only to subscribers; receiving, by the at least one computer processor, a publicly available document or testimony submitted to a legislative or parliamentary body; or receiving, by the at least one computer processor, a summary of, and/or hyperlinks to, a portable document format (pdf) or hyperlink to exemplary relevant news items and other information shared publicly and voluntarily by the publishing entity through one or more social media or publication platforms (e.g., but not limited to, TWITTER; FACEBOOK, TUMBLR; LINKEDIN; or GOOGLE+, etc.).

An exemplary embodiment of the invention may include, the method, wherein the method may further include at least one of: providing, by the at least one computer processor, a social media platform; enabling, by the at least one computer processor, secure, confidential collaboration among pre-identified corporate or trade association teams using data and graphical analysis prepared by the system; or identifying, by the at least one computer processor, data trends across issues delivered using the same graphical representation tools described in items 1-6 above.

An exemplary embodiment of the invention may include, the method, wherein the method may include: where the receiving at least one tag may include: receiving, by the at least one computer processor, at least one tag for relevance.

An exemplary embodiment of the invention may include, the method, wherein the method may further include: where the receiving at least one tag may include at least one of: receiving, by the at least one computer processor, at least one tag for at least one concept; receiving, by the at least one computer processor, at least one tag for at least one date (e.g., but not limited to, issuance, implementation date, and/or a date by which a comment is due if any); receiving, by the at least one computer processor, at least one tag for at least one category type; receiving, by the at least one computer processor, at least one tag for at least one issuing institution; or receiving, by the at least one computer processor, at least one tag for at least one point value for an activity level.

An exemplary embodiment of the invention may include, the method, wherein the method may further include: generating, by the at least one computer processor, an analytical timeline pairing global or national policymaking meetings with specific rule-making processes for individual issues in any jurisdiction covered by the system.

An exemplary embodiment of the invention may include, the method, wherein the method may further include: receiving, by the at least one computer processor, a query based on at least one institution; and providing, by the at least one computer processor, at least one search result comprising said quantitative and non-quantitative data associated with said at least one institution.

An exemplary embodiment of the invention may include, a system for translating non-quantitative data into at least one quantitative risk management tool, the system may include, a memory; and at least one processor, coupled to said memory, said at least one processor adapted to receive non-quantitative data relating to financial regulatory and economic policy; receive at least one tag relating to said non-quantitative data; store said non-quantitative data and said at least one tag in a database; and provide the at least one quantitative risk management tool comprising being adapted to at least one of: provide graphical or numerical activity-based search results sorted by activity type or institution type, or provide access to underlying documents upon request.

An exemplary embodiment of the invention may include, a nontransitory computer program product embodied on at least one computer readable medium comprising program logic, which when executed on at least one processor, performs a method for translating non-quantitative data into at least one quantitative risk management tool, the method may include: receiving, by at least one computer processor, non-quantitative data relating to financial regulatory and economic policy; receiving, by the at least one computer processor, at least one tag relating to said non-quantitative data; storing, by the at least one computer processor, said non-quantitative data and said at least one tag in a database; and providing, by the at least one computer processor, the at least one quantitative risk management tool.

According to an exemplary embodiment, a system, method and computer program product may be provided for assembling a database of publicly available official sector documents that have been meta-tagged for relevance by, e.g., but not limited to, concept, date, and issuing entity.

According to an exemplary embodiment, the system may use the database to generate automatic, customized graphs and quantitative representations of overnight activity on specific issues selected by users as being of interest.

According to an exemplary embodiment, the system may enable display to users in graphical and quantitative terms what types of policy activity occurred overnight in their pre-selected issues of interest and then may enable users to interactively drill down, via user interface elements, to the source documents within any quantitative category.

According to an exemplary embodiment, the system may provide users with search tools using both meta-tags and natural language methods to receive search queries, and to provide search results first in the form of exemplary graphical results showing quantitative activity levels on specific issues by category type over the time period covered by the database, and may provide for interactive user interface elements adapted to enable a user to have the ability to drill down via the system to access source documents within any category.

According to an exemplary embodiment, the system may provide users with the ability to automatically craft time series data that may chart key policy meeting dates in parallel with key regulatory rulemaking deadlines across multiple jurisdictions, the user's own financial contract maturity structures and/or related cross-border public policy processes.

According to an exemplary embodiment, the system may provide particular clients and/or subscribers to publications, additional advanced, premium features. Such advanced features may include providing the system to be able to display to the user on an integrated basis, analysis prepared for the premium user, on a confidential basis, displayed in the user's search results, content, but no other users would have access to the content for which that particular user paid.

According to an exemplary embodiment, the system may provide pre-identified teams of users with confidential social collaboration tools to discuss and share customized search results and other documents within the database.

According to an exemplary embodiment, the system may incorporate selected information shared publicly through, e.g., but not limited to, Twitter, on, e.g., but not limited to, a PDF basis, or by providing access to the underlying Tweet through a hyperlink, etc. The system may also purchase and incorporate such user data as Twitter may choose to sell to third parties in order to augment activity-level monitoring and quantification.

According to an exemplary embodiment, the system may meta-tag based on static PDFs (or any other non-editable standard file-sharing framework that may emerge), and may craft a graphical interface for user access to the meta-tagged data.

According to an exemplary embodiment, the system may provide a closed, edited and curated, database and may allow users to perform search queries that occur inside the closed database. Access to the database will occur over the web, but searches are executed exclusively on the closed database.

Further features and advantages of the invention, as well as the structure and operation of various exemplary embodiments of the invention, are described in detail below with reference to the accompanying drawings.

BRIEF DESCRIPTION OF THE DRAWINGS

The foregoing and other features and advantages of the invention will be apparent from the following, more particular description of an embodiment of the invention, as illustrated in the accompanying drawings wherein like reference numbers generally indicate identical, functionally similar, and/or structurally similar elements. The left most digits in the corresponding reference number indicate the drawing in which an element first appears.

DETAILED DESCRIPTION OF VARIOUS EXEMPLARY EMBODIMENTS OF THE PRESENT INVENTION

Semantic search permits dynamic and efficient processes for identifying where key phrases exist within documents, but conventional semantic search fails to provide quantitative or qualitative analysis of results. Conventionally, semantic search does not analyze how (and how often) identified phrases are used in different documents, much less correlating usage across different formats. Consequently, conventionally, public policy processes have been perceived as being non-quantifiable, despite the fact that cross-border public policy coordination, including, e.g., but not limited to, coordination in various economic sectors, is actively underway and notified using public communications mechanisms.

An exemplary embodiment of the invention may seek to convert text based qualitative documents relating to public policy processes into risk management and other analysis tools. For example, according to an exemplary embodiment of the invention, a system may be provided to make possible turning qualitative text(s) regarding cross-border public policy processes into quantitative financial risk management tools. In an exemplary embodiment, exemplary quantitative financial risk management tools may, e.g., but not limited to, (i) provide customized, automatic daily quantitative and/or graphical illustrations of cross-border public policy activity levels and/or (ii) identify correlations using concepts and/or other meta-tagging tools to generate graphs or other output, and/or (iii) provide an individual user(s) with a capacity to activate data mining tools to extract various exemplary quantitative and/or graphical information from, e.g., but not limited to, stored, tagged non-quantitative data and/or to conduct exemplary semantic search techniques of those documents, with results delivered as quantitative and/or graphical output(s).

Figure 1:
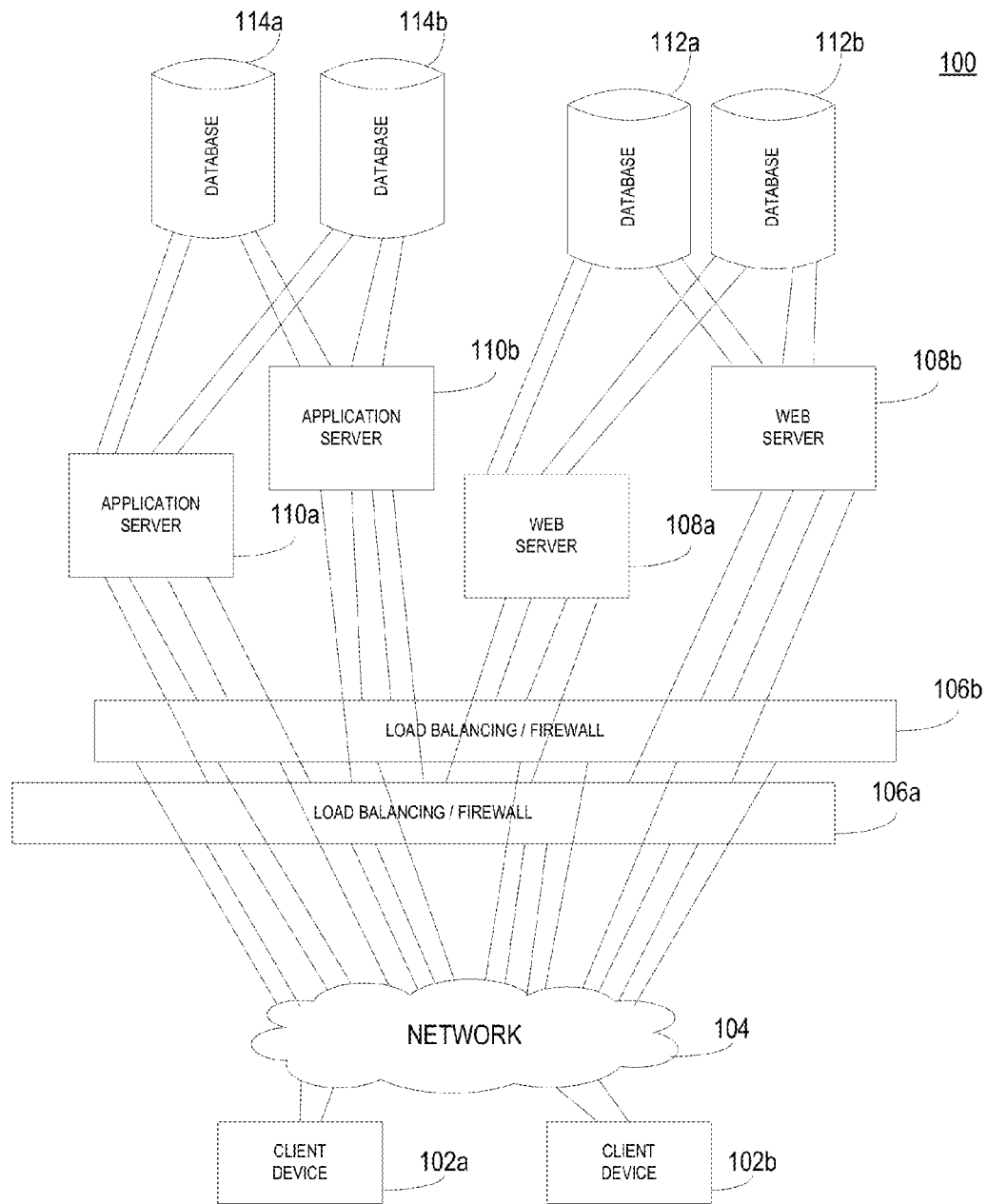
FIG. 1 depicts an exemplary embodiment of a high level system block diagram of an exemplary system that can be used to provide a non-quantitative information search and response engine according to the present invention.

FIG. 1 illustrates an exemplary overview of an exemplary system as may be used in an exemplary environment according to various exemplary embodiments of the present invention. FIG. 1 depicts an exemplary embodiment of a high level system block diagram 100 that can be used to provide an exemplary system for providing a non-quantitative information search and response engine according to an exemplary embodiment of the present invention.

The high level system block diagram 100 of FIG. 1 may include, in an exemplary embodiment, users interacting with browsers on client devices 102a, or 102b (collectively 102), respectively. Browsers can be, e.g., but not limited to, application software programs executing on computer workstations or other computer processor based devices 102 (including mobile devices such as, e.g., but not limited to, communication devices, phones, smartphones, tablets, and/or computer tablets), which may be coupled via a network 104 (in wireline and/or wireless fashion) to other devices, as shown, in an exemplary embodiment. Workstations 102 can be coupled via a network 104 such as, e.g., but not limited to, an internet, and intranet, or another type of network. In an exemplary embodiment network 104 may include the global Internet. Network 104 may provide access for client devices 102 to gain access to, e.g., but not limited to, one or more application servers 110a, 110b (collectively 110), such as, e.g., but not limited to, a database management system (DBMS). Although a client server topology is discussed any of various other well-known types of communications topologies may also be used such as, e.g., but not limited to, point-to-point, peer-to-peer, cloud-based, software as a service (SAAS), browser-based, hierarchical, distributed, and/or centralized, etc. The application server 110 can manage one or more databases (collectively 112). In an exemplary embodiment, the application server 120 can access an exemplary database(s) 114 having a plurality of data records, where in an exemplary embodiment, each data record may have one or more fields, etc. It will be apparent to those skilled in the art, that each database 112, 114 can be part of a larger database, or could be broken into a plurality of separate subdatabases. In an exemplary embodiment of the present invention, search results can include a plurality of records obtained from the database 112, 114 that meet search criteria included in a search query. Network 104 may be coupled to any of various well known components such as, e.g., but not limited to, one or more load balancing devices or firewall devices 106a, 106b (collectively 106), web server(s) 108, application server(s) 110, routers, gateways, physical layer devices, data link layer devices, and/or network layer devices, etc.

As illustrated, web servers 108 and application servers 110 may be coupled to one another via one or more network(s) 104. Although network 104 is shown, in an exemplary embodiment, as being downstream of load balancing devices 106, it is also possible to have a network upstream of load balancing devices 104, coupling, e.g., but not limited to, application server(s) 110, web server(s) 108, and/or database(s) 112, 114, as well as other client or other server devices (not shown), local and/or remote from the depicted exemplary devices, etc. Exemplary client devices 102 are depicted downstream over an exemplary network(s) 104 from the server devices, but could easily be elsewhere in the network topology, e.g., inside, or outside a firewall. It is also important to note that network 104 is represented in cloud metaphor symbology, but various well known network devices including various well-known star-based, bus-based, or other well known network topologies may also be represented by exemplary network(s) 104.

A user interacting with a browser on workstation 102a can access the database 114a, in an exemplary embodiment by traversing several intervening networks using well known communications protocols such as, e.g., but not limited to, transmission control protocol/internet protocol (TCP/IP). Specifically, in an exemplary embodiment, the workstation 102a can be coupled via exemplary network(s) 104 including, e.g., but not limited to, a public and/or private network, and/or the global Internet to any of various exemplary website system(s), in this exemplary case, web server(s) 108a, 108b (collectively 108), which may include any of various hosting systems such as, e.g., but not limited to, a domain system, a domain name server (DNS), a domain controller system, etc. Website or webserver system 108 in an exemplary embodiment can be, e.g., but not limited to, the BCM International Regulatory Analytics LLC website available from BCM International Regulatory Analytics LLC, 1701 Pennsylvania Avenue, NW, Suite 300 PMB 443 Washington, D.C. 20006 USA. The website system 110 can include, in an exemplary embodiment, an exemplary firewall 106 coupled to, or in addition to, or integrated with, a load balancer 106a, 106b (which could alternatively run on a general purpose computer such as, e.g., web server 108a, 108b, etc. Load balancer 106 can be coupled to an exemplary web server 108a, and 108b. Web servers 108a, 108b can be mesh coupled to one or more application servers 110a, 110b, via hardware and/or software system solutions, according to an exemplary embodiment, or via another network 104 (not shown). Each server 108, 110, may include, e.g., but not limited to, or be coupled to, one or more database(s) 112, 114. Web server(s) 108a, 108b in an exemplary embodiment, can perform load balancing functions by transferring user requests/queries to one or more of the application servers 110a, 110b according to exemplary semantics, or techniques for retrieving knowledge from richly structured data sources such as, e.g., but not limited to, ontologies, or other formal articulation of domain knowledge at a high level expressiveness, indicating user intent at query time, and/or rules, etc. Results of the exemplary search queries from database 114 can be transferred from application servers 110a, 110b through web servers 108a, 108b through the network 104 to workstation 104.

Overview of Exemplary System

An example technology platform may include, in an exemplary embodiment, a system, method, or computer program product for translating non-quantitative information into a suite of exemplary quantitative risk management tools related to, e.g., but not limited to, cross-border policy, such as, e.g., but not limited to, regulatory, financial policy, financial regulatory policy, economic policy, health policy, agricultural policy, trade policy, intellectual property rights policy, and/or development policy, etc. The platform, according to an exemplary embodiment, may pair semantic web search technology and meta-data tagging to create a customized, edited database designed to deliver analytical content automatically. The platform may also enable users to search the concept-based database to generate, e.g., but not limited to, customized quantitative graphs and/or timelines, according to an exemplary embodiment. Finally, the platform may incorporate one or more social media solutions to provide insight into which issues on the platform are "trending" and may provide capacity for secure, confidential collaboration among teams, according to an exemplary embodiment.

An example, but non-limiting technology platform, according to an exemplary embodiment, may include, a system, method, or computer program product for translating non-quantitative information in an exemplary embodiment, into a suite of exemplary quantitative risk management tools related to, e.g., but not limited to, crossborder public policy (e.g., but not limited to, financial regulatory and economic policy, etc.). The exemplary platform, according to an exemplary embodiment, may pair semantic web search technology and meta-data tagging to create a customized, edited database designed to deliver analytical content automatically as well as enable users to search the concept-based database to generate customized quantitative graphs and timelines, according to an exemplary embodiment. Finally, the platform may incorporate one or more social media solutions to provide insight into which issues on the platform are "trending" and may provide capacity for secure, confidential collaboration among teams, according to an exemplary embodiment.

According to an exemplary embodiment, a behavioral database may be provided, created, updated, maintained, queried and/or accessed. The behavioral database in an exemplary embodiment may include data about the policy process, and in an exemplary embodiment, cross-border policy. The database may track the process by which policy is made. According to an exemplary embodiment, the system, method, and/or computer program product may systematically follow public policy research. For example, public policy research is commissioned, e.g., there is a process of preparing a speech on a given topic. Such exemplary speeches may be paired with cross-border public policy documents (such as, e.g., but not limited to, treaties, international treaties, international conventions, and the like). Exemplary cross-border policy may include, e.g., but is not limited to, regulatory policy, trade policy, financial policy, economic policy, financial regulatory policy, health policy, agricultural policy, trade policy, intellectual property rights policy, development policy, etc.

According to an exemplary embodiment, using semantic analysis of such qualitative documents, an exemplary embodiment may convert qualitative text into quantitative measures or data for the purpose of identifying connections between cross-border public policy issues, or a leading indicator, (e.g., analyze and determine quantitative measures of the contents of the documents) and may use such data as a leading indicator, or a mechanism to identify trends and potential future policy trajectories. For example, each observation and/or occurrence of official sector action including, e.g., but not limited to, a paper, a piece of policy research (e.g., a policy paper commissioned by a research group), a speech (e.g., a speech in Brussels, Belgium), a hearing (e.g., a hearing in Washington, D.C.) and official sector economic data issuances, may be assigned a quantitative value. A numerical value may be assigned to the observations/occurrences. Thus, numerical values may be assigned to the various policy activity and then trends and/or policy trajectories can be anticipated, and may be analyzed. For example, a computer process-based algorithm may be used to quantify anticipated future policy trajectories, i.e. analyze the quantitative values/measures attributed to the various observations/occurrences and may calculate trend data, may anticipate policy trajectories, may determine relationships, may use covariances and correlations across international economic policy and financial policy activity to recognize relationships. In one exemplary embodiment, all activity may be weighted equally in order to generate volume data indicators of cross-border policy activity levels. In another exemplary embodiment particular types of observations/occurrences may be weighted in greater proportion to other data in order to identify and quantify (with point values and weighting) the extent to which policy trajectories are trending in relation to a specific future event or policy trajectory. Various analyses may be executed by the processor to identify correlations and covariances and may use computer-based automated statistical and datamining methodologies to electronically perform search queries, and to format output in summarized, customized graphical fashion for display, access and interactive review.

According to an exemplary embodiment, the exemplary system may create a dynamic, behavioral database of cross-border public policy processes.

According to an exemplary embodiment, computer based algorithms may quantify such cross-border public policy process behavior data into observational/occurrence based numerical quantitative values.

According to an exemplary embodiment, query results data may be formatted in exemplary graphical chart formats. Query results may be provided in exemplary graphically-rich display form for user viewing and/or interaction, rather than conventional list-based search result format.

According to an exemplary embodiment, cross-border public policy activity may be captured, quantified, tracked, measured and/or analyzed and outputted for review and interactive analysis/access.

Figure 2:
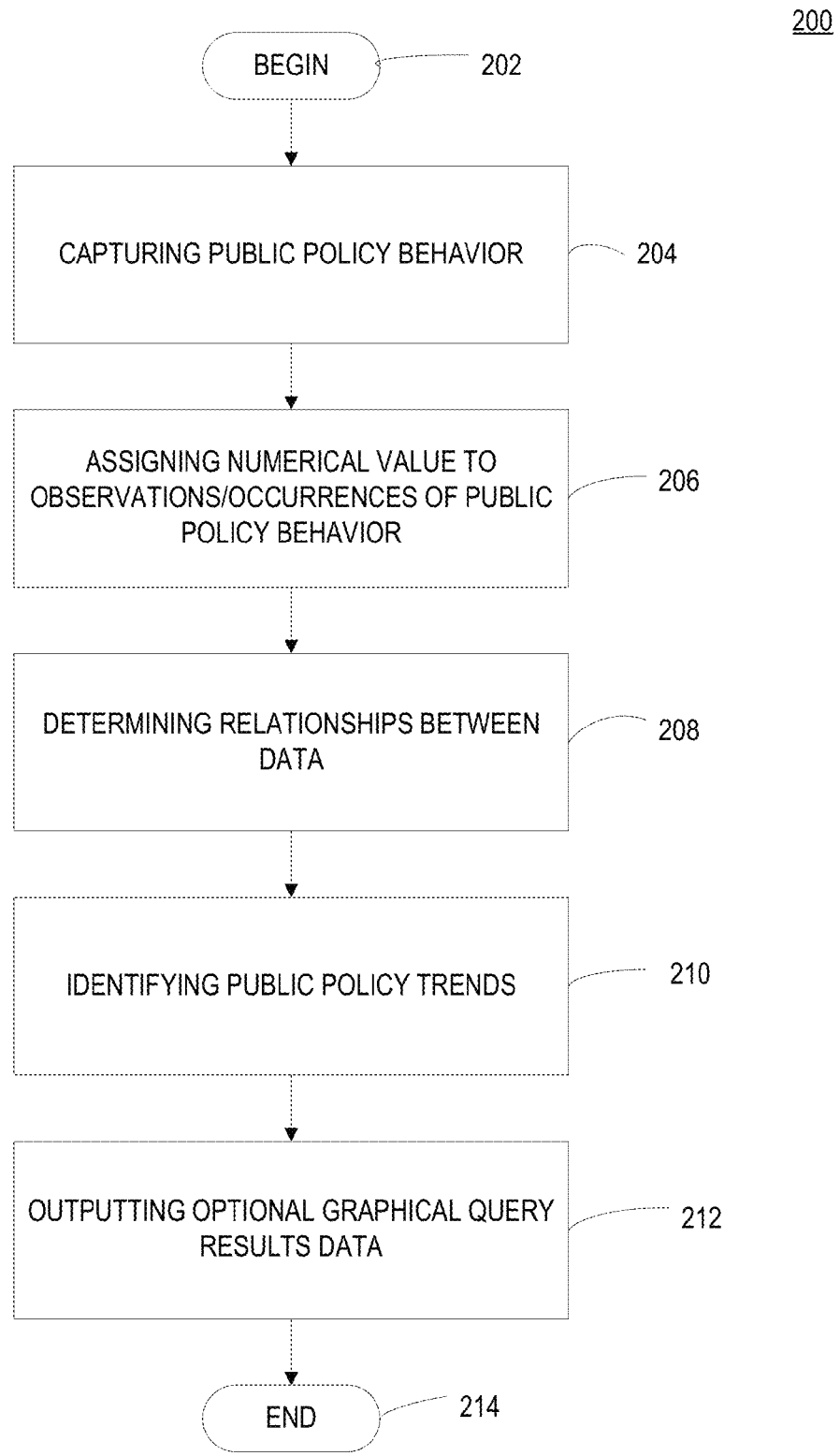
FIG. 2 illustrates an exemplary flow diagram of an exemplary method according to exemplary embodiments of the present invention, translating non-quantitative data into visual analytical graphs that may chart relationships (and decision-points) in, e.g., but not limited to, real time.

FIG. 2 illustrates exemplary flow diagram 200 depicting exemplary elements according to exemplary embodiments of the present invention.

Flow diagram 200 may begin with 202 and may continue immediately with 204.

In 204, according to an exemplary embodiment the processor may capture data about public policy behavior. From 204, flow diagram 200 may continue with 206.

In 206, according to an exemplary embodiment the processor may assign a numerical value to a given observation and/or occurrence of the associated public policy behavior. From 206, flow diagram 200 may continue with 208.

In 208 according to an exemplary embodiment the processor may determine covariances and/or correlations between various observations and/or occurrences data to recognize relationships. From 208, flow diagram 200 may continue with 210.

In 210, according to an exemplary embodiment public policy trends may be identified from analyzed behavior data. From 210, flow diagram 200 may continue with 212.

In 212, according to an exemplary embodiment query results may be outputted by the processor, such as, e.g., but not limited to graphical query results. From 212, flow diagram 200 may continue with 214.

In 214, in an exemplary embodiment, flow diagram 200 may end.

An exemplary embodiment may translate non-quantitative data into exemplary visual analytical graphs that may display and/or chart relationships (and/or decision-points) in real time, for user review and interaction.

An example embodiment may include an exemplary database edited to create a targeted platform of exemplary meta-tagged data regarding public policy activity, such as, e.g., but not limited to, economics and regulatory policy intersections, on a dynamic basis. For example, financial regulatory and economics policy activity and behavior may be analyzed.

An exemplary embodiment may include a database which may demonstrate connections among conceptual issues and may permit one or more users to track document(s) and/or key date(s) (including future dates) in order to support strategic decision-making and scenario analysis.

An example embodiment may translate non-quantitative data into visual analytical graphs that may chart relationships (and decision-points) in real time.

Another example embodiment may include an exemplary database edited to create a targeted platform of meta-tagged data regarding cross-border public policy intersections on a dynamic basis.

Yet, another example embodiment may include a database which may determine, identify, display/demonstrate connections among conceptual issues and may permit one or more users to track document(s) and/or key date(s) (including future dates) in order to support strategic decision-making and scenario analysis.

Figure 3A:
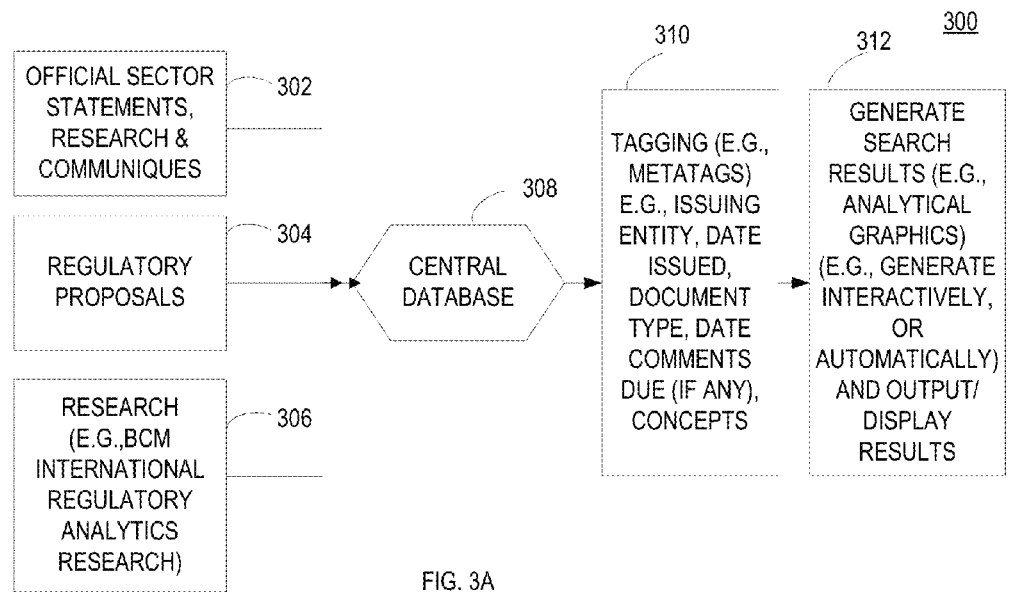
FIG. 3A, in an exemplary embodiment depicts three exemplary data inputs to an exemplary database, which may be a central database, where tags may be added as shown, and output may be generated automatically, or interactively, (including output such as, e.g., but not limited to, graphical output)

FIG. 3A, in an exemplary embodiment depicts a diagram 300 illustrating an exemplary three exemplary data inputs official sector statements, research & communiques 302, regulatory proposals 304, research 306 to an exemplary database 308, which may be a central database, in an exemplary embodiment. Tags such as, e.g., but not limited to, a metatag, or other meta data, may be added as shown in 310 in FIG. 3A. As illustrated in 310, exemplary metatagging may include, e.g., but not limited to, issuing entity, date issued, document type, date comments due (if any), and concepts, etc. In 312, exemplary search results may be obtained or generated (e.g., generated automatically or interactively), and results may be outputted or displayed. In an exemplary embodiment, proprietary analytical graphics may be delivered automatically, and/or on request from client, to client (See description below with reference to FIGS. 4-10 for exemplary output graphics).

Exemplary Processing and Communications Embodiments

Figure 3B:
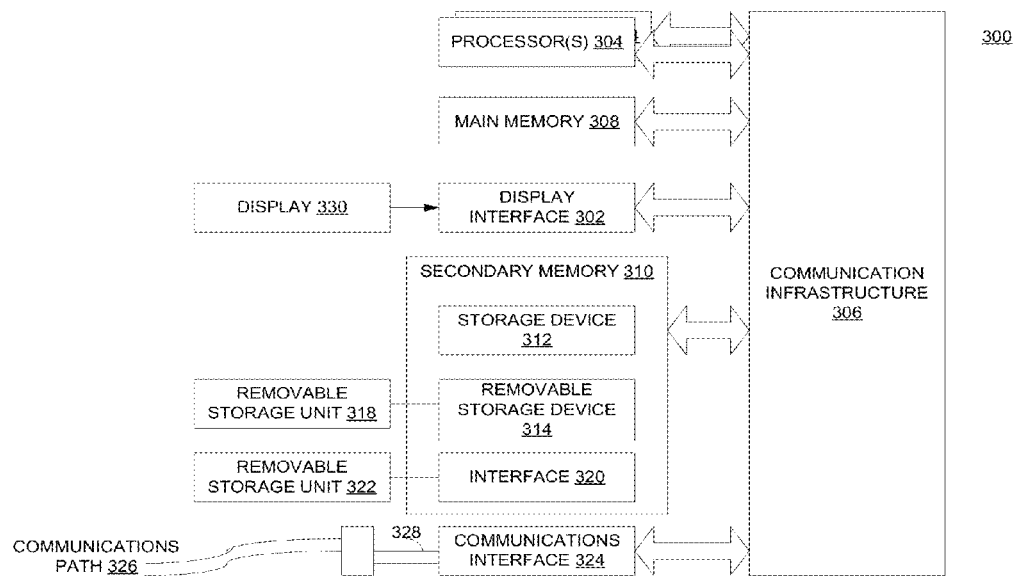
FIG. 3B depicts an exemplary embodiment of a computer system that may be used in association with, in connection with, as component of, and/or in place of, e.g., but not limited to, any of the foregoing components, computers, processors, computing devices, communications devices, phones, smartphones, tablets, portable, client, server, and/or systems, according to an exemplary embodiment.

FIG. 3B depicts an exemplary embodiment of a computer system 300 that may be used in association with, in connection with, and/or in place of, but not limited to, any of the foregoing components and/or systems, according to an exemplary embodiment. Various exemplary electronic computer systems may be networked to one another and integrated to collectively compute and perform elements of the exemplary embodiments. Such computing systems may include, e.g., but are not limited to, an index design computing device, an index creation and construction computing device, an index calculation device, an index management device, a portfolio creation device, a portfolio management device, a securities trading device, an index storage and access database, an index display and communication device, among others, etc., according to various exemplary embodiments. It should be noted, however, that the exemplary embodiments of the invention may be implemented on any computing device(s), processor(s), computer(s) and/or communications device(s).

The present embodiments (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 300 is shown in FIG. 3, depicting an exemplary embodiment of a block diagram of an exemplary computer system useful for implementing the present invention. Specifically, FIG. 3 illustrates an example computer 300, which in an exemplary embodiment may be, e.g., (but not limited to) a personal computer (PC) system running an operating system such as, e.g., (but not limited to) WINDOWS MOBILETM™ for POCKET PC, or MICROSOFT® WINDOWS® 8/7/XP/NT/98/2000/XP/CE/, etc. available from MICROSOFT® Corporation of Redmond, Wash., U.S.A., SOLARIS® from SUNO Microsystems of Santa Clara, Calif., U.S.A., OS/2 from IBM® Corporation of Armonk, N.Y., U.S.A., Mac/OS, OS/X, iOS, etc. from APPLE® Corporation of Cupertino, Calif., U.S.A., etc., ANDROID from Google Corporation, or any of various versions of UNIX® (a trademark of the Open Group of San Francisco, Calif., USA) including, e.g., LINUX®, HPUX®, IBM AIX®, and SCO/UNIX®, etc. However, the invention may not be limited to these platforms. Instead, the invention may be implemented on any appropriate computer system, communications, or other device, running any appropriate operating system. In one exemplary embodiment, the present invention may be implemented on a computer system operating as discussed herein. An exemplary computer system, computer 300 is shown in FIG. 3B. Other components of the invention, such as, e.g., (but not limited to) a computing device, a communications device, a telephone, a personal digital assistant (PDA), a personal computer (PC), a mobile device, a tablet device, an Android device, an iOS device, a Windows 8 device, a handheld PC, an iPhone, an iPAD, a mobile phone, a tablet, a cell phone, client workstations, thin clients, thick clients, proxy servers, network communication servers, remote access devices, client computers, server computers, routers, web servers, data, media, audio, video, telephony or streaming technology servers, etc., may also be implemented using a computer such as that shown in FIG. 3B.

The computer system 300 may include one or more processors, such as, e.g., but not limited to, processor(s) 304. The processor(s) 304 may be connected to a communication infrastructure 306 (e.g., but not limited to, a communications bus, cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 300 may include a display interface 302 that may forward, e.g., but not limited to, graphics, text, and other data, etc., from the communication infrastructure 306 (or from a frame buffer, etc., not shown) for display on the display unit 330, e.g., a monitor, touchscreen, display, etc.

The computer system 300 may also include, e.g., but may not be limited to, a main memory 308, random access memory (RAM), and a secondary memory 310, etc. The secondary memory 310 may include, for example, (but not limited to) a hard disk drive 312 and/or a removable storage drive 314, representing a floppy diskette drive, a hard disk drive, a magnetic tape drive, an optical disk drive, a write once read many (WORM) device, a compact disk drive CD-ROM, digital versatile disk (DVD), an SD ram card, a flash memory device, a USB storage device, etc. The removable storage drive 314 may, e.g., but not limited to, read from and/or write to a removable storage unit 318 in a well known manner. Removable storage unit 318, also called a program storage device or a computer program product, may represent, e.g., but not limited to, a floppy disk, magnetic tape, optical disk, compact disk, etc. which may be read from and written to by removable storage drive 314. As will be appreciated, the removable storage unit 318 may include a computer usable storage medium having stored therein computer software and/or data.

In alternative exemplary embodiments, secondary memory 310 may include other similar devices for allowing computer programs or other instructions to be loaded into computer system 300. Such devices may include, for example, a removable storage unit 322 and an interface 320. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, USB drive, FLASH memory, and other removable storage units 322 and interfaces 320, which may allow software and data to be transferred from the removable storage unit 322 to computer system 300.

Computer 300 may also include an input device such as, e.g., (but not limited to) a keyboard, touch screen, a tablet screen, a button, a mouse, stylus, or other pointing device such as a digitizer, and a keyboard or other data entry device (none of which are labeled).

Computer 300 may also include output devices, such as, e.g., (but not limited to) display 330, and display interface 302. Computer 300 may include input/output (I/O) devices such as, e.g., (but not limited to) communications interface 324, cable 328 and communications path 326, etc. These devices may include, e.g., but not limited to, a network interface card, and modems (neither are labeled). Communications interface 324 may allow software and data to be transferred between computer system 300 and external devices. Examples of communications interface 324 may include, e.g., but may not be limited to, a modem, a network interface (such as, e.g., an Ethernet card), a communications port, a Personal Computer Memory Card International Association (PCMCIA) slot, PC Card slot, a memory slot, a universal serial bus (USB) interface device, and/or card, etc. Software and data transferred via communications interface 324 may be in the form of signals 328 which may be electronic, electromagnetic, optical or other signals capable of being received by communications interface 324. These signals 328 may be provided to communications interface 324 via, e.g., but not limited to, a communications path 326 (e.g., but not limited to, a channel). This channel 326 may carry signals 328, which may include, e.g., but not limited to, propagated signals, and may be implemented using, e.g., but not limited to, wire or cable, fiber optics, a telephone line, a cellular link, a wireless link, an radio frequency (RF) link and other communications channels, etc.

In this document, the terms "computer program medium" and "computer readable medium" may be used to generally refer to media such as, e.g., but not limited to removable storage drive 314, a hard disk installed in hard disk drive 312, a flash device, a memory, and signals 328, etc. These computer program products may provide software to computer system 300. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, magneto-optical, acoustical or other forms of propagated signals (e.g., carrier waves, infrared signals, digital signals, etc.), which when nontransitory are embodied on a computer readable media, and others.

Computer programs (also called computer control logic), may include object oriented computer programs, apps, pre-loaded, and distributed by network or media, and may be stored in main memory 308 and/or the secondary memory 310 and/or removable storage units 314, also called computer program products. Such computer programs, when executed, may enable the computer system 300 to perform the features of the present invention as discussed herein. In particular, the computer programs, when executed, may enable the processor 304 to provide a method to perform various steps as described in various embodiments herein, according to an exemplary embodiment of the present invention. Accordingly, such computer programs may represent controllers of the computer system 300.

In another exemplary embodiment, the invention may be directed to a computer program product comprising a computer readable medium having control logic (computer software, application programs, apps, etc.) stored therein. The control logic, when executed by the processor 304, may cause the processor 304 to perform the functions of the invention as described herein. In another exemplary embodiment where the invention may be implemented using software, the software may be stored in a computer program product and loaded into computer system 300 using, e.g., but not limited to, removable storage drive 314, hard drive 312 or communications interface 324, etc. The control logic (software), when executed by the processor 304, may cause the processor 304 to perform the functions of the invention as described herein. The computer software may run as a standalone software application program running atop an operating system, or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

Exemplary embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer, communications device, processor, mobile device, personal digital assistant (PDA), tablet, phone, smartphone, etc.). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), magneto-optical, SDRAM, thumb drives, FLASH, etc., and others.

The exemplary embodiment of the present invention makes reference to wired, wireline, and/or wireless networks (and any hybrids). Wired networks include any of a wide variety of well known means for coupling voice and data communications devices together. A brief discussion of various exemplary wireless network technologies that may be used to implement the embodiments of the present invention now are discussed. The examples are non-limited. Exemplary wireless network types may include, e.g., but not limited to, code division multiple access (CDMA), spread spectrum wireless, orthogonal frequency division multiplexing (OFDM), 1G, 2G, 3G wireless, Bluetooth, Infrared Data Association (IrDA), shared wireless access protocol (SWAP), "wireless fidelity" (Wi-Fi), WIMAX, and other IEEE standard 802.11-compliant wireless local area network (LAN), 802.16-compliant wide area network (WAN), and ultrawideband (UWB), etc. Bluetooth is an emerging wireless technology promising to unify several wireless technologies for use in low power radio frequency (RF) networks. IrDA is a standard method for devices to communicate using infrared light pulses, as promulgated by the Infrared Data Association from which the standard gets its name. Since IrDA devices use infrared light, they may depend on being in line of sight with each other.

The exemplary embodiments of the present invention may make reference to WLANs. Examples of a WLAN may include a shared wireless access protocol (SWAP) developed by Home radio frequency (HomeRF), and wireless fidelity (Wi-Fi), a derivative of IEEE 802.11, advocated by the wireless Ethernet compatibility alliance (WECA), Wi-Max (IEEE 802.16), Wi-WAN, BlueTooth, and/or other wireless standard. The IEEE 802.11 wireless LAN standard refers to various technologies that adhere to one or more of various wireless LAN standards. An IEEE 802.11 compliant wireless LAN may comply with any of one or more of the various IEEE 802.11 wireless LAN standards including, e.g., but not limited to, wireless LANs compliant with IEEE std. 802.11a, b, d or g, such as, e.g., but not limited to, IEEE std. 802.11 a, b, d and g, (including, e.g., but not limited to IEEE 802.11g-2003, etc.), etc.

Figure 4:
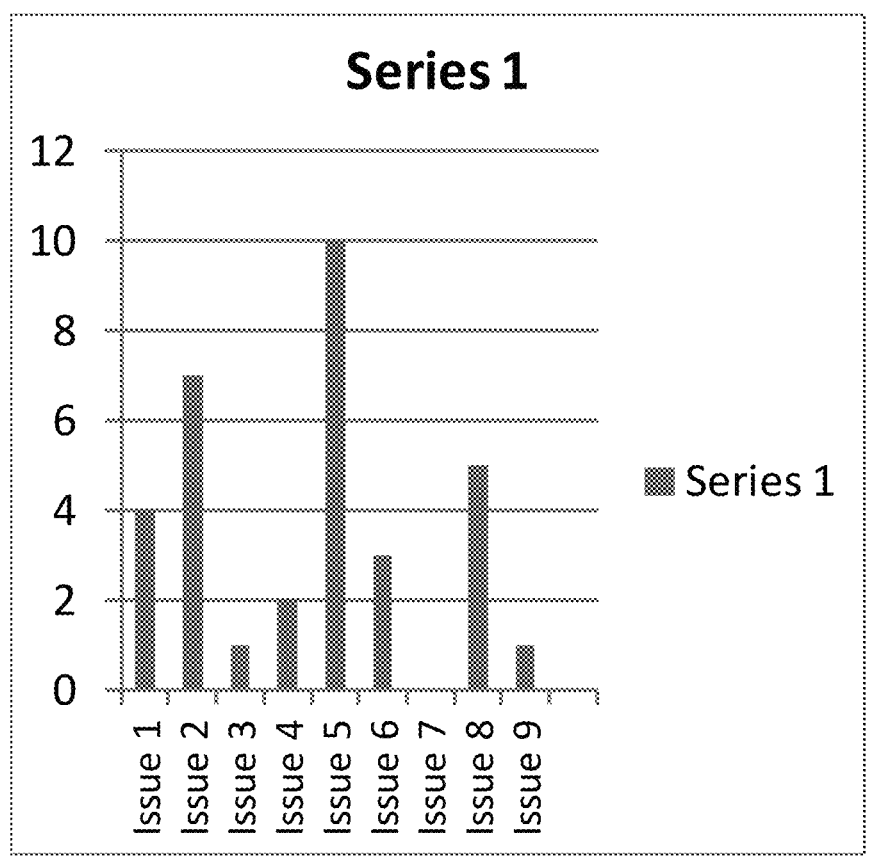
FIG. 4 illustrates an exemplary home screen as may be created by an exemplary system and may output, and/or display for interactive user viewing/access, and/or may use, and/or provide as a graphical user interface (GUI), for an exemplary application program and/or system according to exemplary embodiments of the present invention, including exemplary overnight (or other time period of) activity according to one exemplary embodiment.

FIG. 4 illustrates an exemplary home screen 400 as may be created by an exemplary system and may output and/or display for interactive user viewing/access and use, or provide as a graphical user interface, for an exemplary application program and/or system according to exemplary embodiments of the present invention.

An exemplary system may allow each user to select one or more individual issue(s) to track, in an exemplary embodiment.

Periodically, such as, e.g., but not limited to, each morning, etc., a graph may be provided by an exemplary system, which may provide for viewing a graphical representation of overnight activity, which may, according to an exemplary embodiment, depict activity levels for exemplary individual issues loaded previously (e.g., on the previous day, etc.) into the exemplary database.

The exemplary graph may be delivered to one or more computer(s) and/or mobile device(s), for user interactive access, using, e.g., but not limited to, a touchscreen, voice recognition, gestures, a display, output, pointing device, stylus, and/or mouse, etc. and may be sent simultaneously, in an exemplary embodiment.

Each exemplary bar (or other graphical user interface element, if another shaped graphical portion) may be interactive, enabling receipt of user selections. The user can click on the bar, and the system may receive the selection/request and may provide the user what types of actions were taken on individual items.

Figure 5:
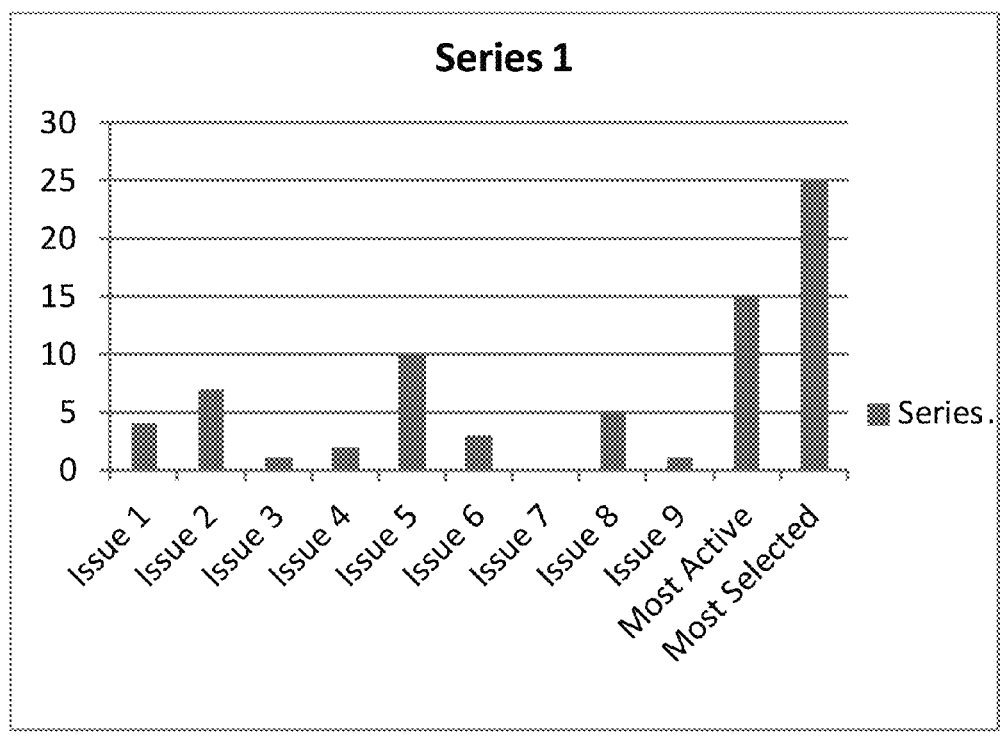
FIG. 5 illustrates an exemplary home screen as may be created by an exemplary system and may output, and/or display for interactive user viewing/access, and/or may use, and/or provide as a graphical user interface (GUI), for an exemplary application program and/or system according to exemplary embodiments of the present invention, according to an exemplary embodiment, the exemplary home screen may create, generate, store, output, display, and/or provide for interactive access, activity for a given time period, such as, e.g., but not limited to, a period such as an overnight period, and in an exemplary embodiment may include exemplary social media input optional data captured.

FIG. 5 illustrates an exemplary home screen 500 as may be created by an exemplary system and may output and/or display for interactive user viewing/access and/or provide, or use as a graphical user interface, for an exemplary application program and/or system according to exemplary embodiments of the present invention. According to an exemplary embodiment, the exemplary home screen may, e.g., but not limited to, create, generate, maintain, store, modify, output, display and/or provide for interactive access, activity for a given time period, such as, e.g., but not limited to, a period of time, such as, e.g., but not limited to, an overnight period, along with exemplary social media data option, according to an exemplary embodiment. For example, activity may be captured from a social media application such as, e.g. but not limited to, TWITTER, or other social media environment including a proprietary private social media environment. "Most selected" and "most active" issues may be highlighted as shown.

In an exemplary embodiment, the system may receive from each user one or more parallel issues that the system can track in parallel, including issues not central to the given user's strategic interest but which may be trending on the platform in terms of, e.g., but not limited to, aggregate overnight activity levels, and/or in terms of "most selected issues," etc.

Figure 6:
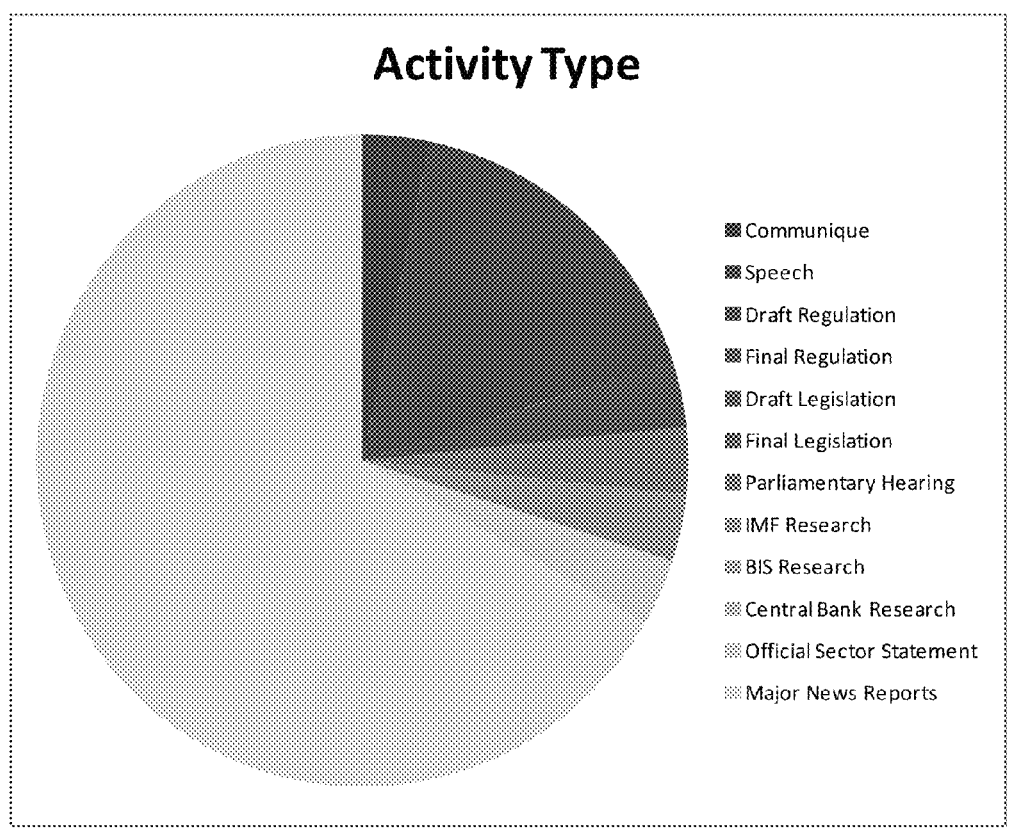
FIG. 6 illustrates an exemplary screen as may be created by an exemplary system and may output, display for interactive user viewing/access, and/or may use, and/or provide as a graphical user interface (GUI), for an exemplary application program and/or system according to exemplary embodiments of the present invention, wherein the exemplary screen may create, generate, store, output, display and/or provide for interactive access, exemplary issue-specific activity for, e.g., but not limited to, a given time period.

FIG. 6 illustrates an exemplary screen 600 as may be created by an exemplary system and may output and/or display for interactive user viewing/access and use as a graphical user interface GUI, for an exemplary application program and/or system according to exemplary embodiments of the present invention. According to an exemplary embodiment, the exemplary screen may, e.g., but not limited to, create, generate, manage, store, modify, output, display and/or provide for interactive access, issue-specific activity for a given time period. In an exemplary embodiment, a pie chart may graphically represent data of volumes of various activity types, illustrating different exemplary types of observations/occurrences tallied for a given time period and/or topic. Exemplary illustrated types of observations/occurrences include communiques, speeches, draft regulations, final regulation, draft legislation, final legislation, parliamentary hearing, IMF Research, BIS Research, Central Bank Research, Official Sector Statement, and/or Major News Reports.

According to an exemplary embodiment, the system may display for the user what type of activity may have occurred for the specific issue.

Each bar and/or pie shaped sector may be an interactive graphical user interface element. The system may receive a user selection (e.g., but not limited to, a click) on the bar/sector to access, e.g., but not limited to, a PDF document, and/or list of PDFs that may comprise the overnight activity for the given issue.

Figures 7, 8:
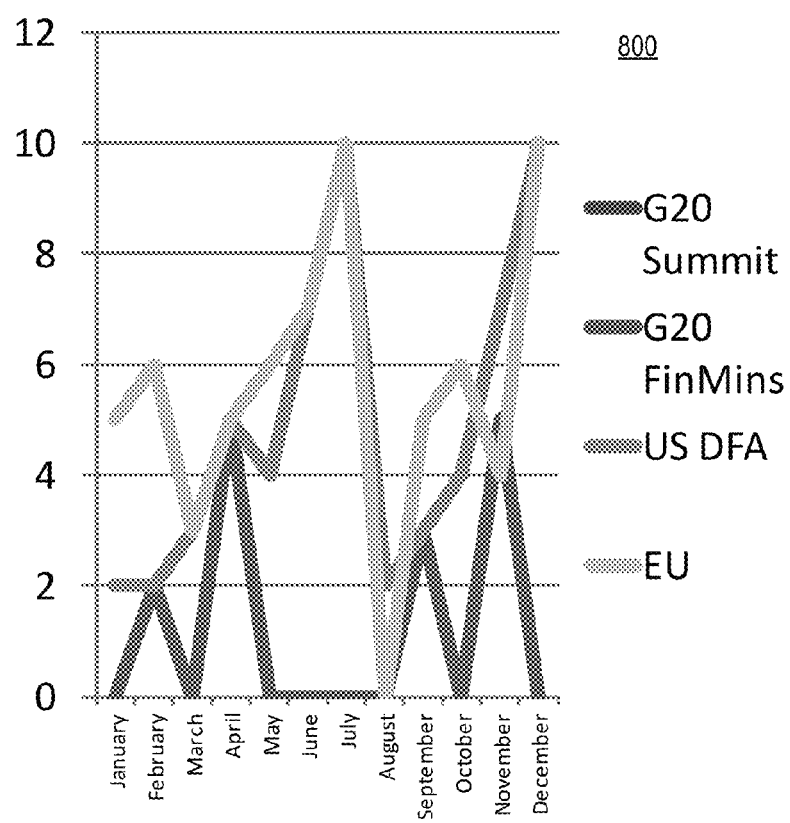
FIG. 7 illustrates an exemplary screen as may be created by an exemplary system and may output, and/or display for interactive user viewing/access, and/or use as a user interface (UI), for an exemplary application program and/or system according to exemplary embodiments of the present invention, wherein the exemplary screen may create, generate, store, output, display and/or provide for interactive access, specific documents such as, e.g., but not limited to, portable document format (PDF) or other formatted documents or input.
FIG. 8 illustrates an exemplary screen as may be created by an exemplary system and may output, and/or display for interactive user viewing/access, and/or use and/or provide as a user interface (GUI), for an exemplary application program and/or system according to exemplary embodiments of the present invention, wherein the exemplary screen may, e.g., but not limited to, create, generate, store, output, display and/or provide for interactive access, an exemplary research option 1, which may include, in an exemplary embodiment, an exemplary timeline, according to an exemplary embodiment.

FIG. 7 illustrates an exemplary screen 700 as may be created by an exemplary system and may output and/or display for interactive user viewing/access and may provide, or use as a user interface, for an exemplary application program and/or system according to exemplary embodiments of the present invention. According to an exemplary embodiment, the exemplary screen may create, generate, communicate, store, modify, output, display and/or provide for interactive access, specific documents such as, e.g., but not limited to, portable document format (PDF) speech documents as shown, including, but not limited to, documents Speech 1, Speech 2, Speech 3, and/or Speech 4, according to an exemplary embodiment.

Receiving a click on a bar in Screen 2 may cause the exemplary system to generate an exemplary list of exemplary PDF speech documents, as illustrated on the right.

Receiving a click on one of the exemplary portable document format (PDF) documents may display the full text to a user, and may have the relevant issue word highlighted and/or hyperlinkable.

In an exemplary embodiment, only publicly available texts, issued by governments (by, e.g., government ministry or an international institution), and news stories in the public domain, may be included in the exemplary database.

According to an exemplary embodiment, a list of content and/or icons representing content (e.g., portable document format (PDF) files) may be outputted as shown in the exemplary listing of exemplary speech transcripts captured in exemplary PDF format depicted in FIG. 7.

FIG. 8 illustrates an exemplary screen 800 as may be created by an exemplary system and may output and/or display for interactive user viewing/access and use as a user interface, for an exemplary application program and/or system according to exemplary embodiments of the present invention. According to an exemplary embodiment, the exemplary screen may create, display and provide for interactive access, an exemplary research option 1, which may include, in an exemplary embodiment, a timeline (January through December), according to an exemplary embodiment. According to an exemplary embodiment, line graphs may be plotted (illustrating in dark line G20 Summit mentions, in lighter line G20 Fin Min mentions, in even lighter line US DFA, and in lightest line EU) and outputted as shown in the exemplary chart or graphic depicted in FIG. 8.

An exemplary embodiment may receive a query from a user, and may search the database to obtain, and provide results, as shown in FIG. 8, for example, delivering, e.g., exemplary customized timelines for past and/or future events.

Exemplary dynamic evaluation of decision-points, activity points, or relationships, across policy initiatives may be provided, e.g., in real-time, according to an exemplary embodiment.

An exemplary embodiment may provide point values/ weightings, which may be set on an exemplary scale of, e.g., but not limited to, 1-10, with, e.g., but not limited to, summits and/or final legislation/regulation rated a 10 and hearings rated a 5, etc. Activity may be weighted equally or may be weighted in proportion to other data. In an exemplary embodiment, once the exemplary database has been populated, proprietary algorithmic formulas may be used, executed to capture cross-border correlations and/or covariances across various activity and/or concept types. In an exemplary embodiment, metadata, coding and/or relational database technology may be used including records with one or more fields to track attributes of data, allowing searching and/or querying based on particular criteria and/or field values.

Figure 9:
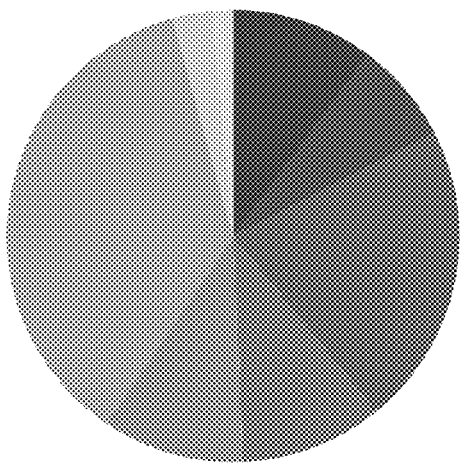
FIG. 9 illustrates an exemplary screen as may be created by an exemplary system and may output, and/or display for interactive user viewing/access, and/or use as a user interface (UI), for an exemplary application program and/or system according to exemplary embodiments of the present invention, wherein the exemplary screen may create, generate, store, output, display and/or provide for interactive access, an exemplary research option 2, which may include, e.g., but not limited to, in an exemplary embodiment, an exemplary historical search, according to an exemplary embodiment.

FIG. 9 illustrates an exemplary screen 900 as may be created by an exemplary system and may output and/or display for interactive user viewing/access and provide and/or use as a user interface (UI), illustrating a pie chart including Communiques, Draft Legislation, Final Legislation, Draft Regulation, Final Regulation, Speeches, IMF Research, BIS Research, Speeches, Hearings, BCM strategy analysis, and/or The Risk Telescope for an exemplary application program and/or system according to exemplary embodiments of the present invention. According to an exemplary embodiment, the exemplary screen may create, display and provide for interactive access, an exemplary research option 2, which may include, in an exemplary embodiment, a historical search, according to an exemplary embodiment.

A user can query the database to find content (e.g., all, or a subset of documents) that reference a specific concept (e.g., financial sector taxation) across all or part of the selected historical period covered by the exemplary database (e.g., 1973-present), in an exemplary embodiment.

Search results may be first delivered in an exemplary pie chart by, e.g., activity type, and then access may be provided by specific PDFs within that activity.

Search results, in an exemplary embodiment, can be segregated by institution type rather than activity type (e.g., Basel Committee; IOSCO, etc), in an exemplary embodiment.

Search results can be narrowed by date ranges as well (e.g., post-2008), in another exemplary embodiment.

Receipt of a user's selection (e.g., clicking on any part of the pie chart) may generate a list of underlying PDFs for review and/or selection.

In an exemplary embodiment, enhanced services may be provided, such as, e.g., but not limited to, previous clients may also find displayed by the system, access to previous client memos, and/or analysis appearing in search results, etc.

Figure 10:
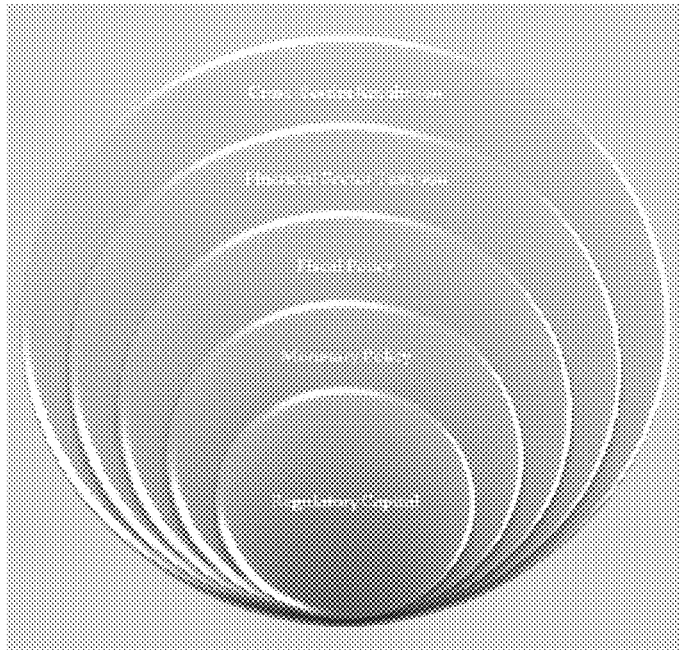
FIG. 10 illustrates an exemplary screen as may be created by an exemplary system and may output, and/or display for interactive user viewing/access, and/or use, or provide, as a user interface (UI), for an exemplary application program and/or system according to exemplary embodiments of the present invention, wherein the exemplary screen may create, generate, store, output, display and/or provide for interactive access, etc., an exemplary research option 3, which may include, in an exemplary embodiment, an exemplary relationship map, such as, e.g., but not limited to, a displayed Venn diagram, according to an exemplary embodiment.

FIG. 10 illustrates an exemplary screen 1000 as may be created by an exemplary system and may output and/or display for interactive user viewing/access and use as a user interface (UI), for an exemplary application program and/or system according to exemplary embodiments of the present invention. According to an exemplary embodiment, the exemplary screen may create, display and provide for interactive access, an exemplary research option 3, which may include, in an exemplary embodiment, a relationship map, (illustrating an exemplary correlated relationship weighted Venn diagram of a Regulatory Capital, a Monetary Policy, Fiscal Policy, Financial Sector Taxation, and/or Cross-Border Resolution, as illustrated) according to an exemplary embodiment.

An exemplary embodiment may allow a user to query the database to find, e.g., but not limited to, all related concepts across, e.g., but not limited to, an entire historical period covered by the database (e.g., 1973-present).

The system may deliver search results, e.g., but not limited to, in an exemplary pie chart by activity type, then by specific PDFs within that activity.

In an exemplary embodiment, search results can be narrowed by date ranges as well (e.g., post-2008).

An exemplary system may receive a user selection such as, e.g., but not limited to, clicking on any part of the pie chart, which may cause the system to generate an exemplary list of underlying PDFs for review.

In an exemplary embodiment, enhanced services may be provided, such as, e.g., but not limited to, previous clients may also find displayed by the system, access to previous client memos, and/or analysis appearing in search results, etc.

Figure 11:
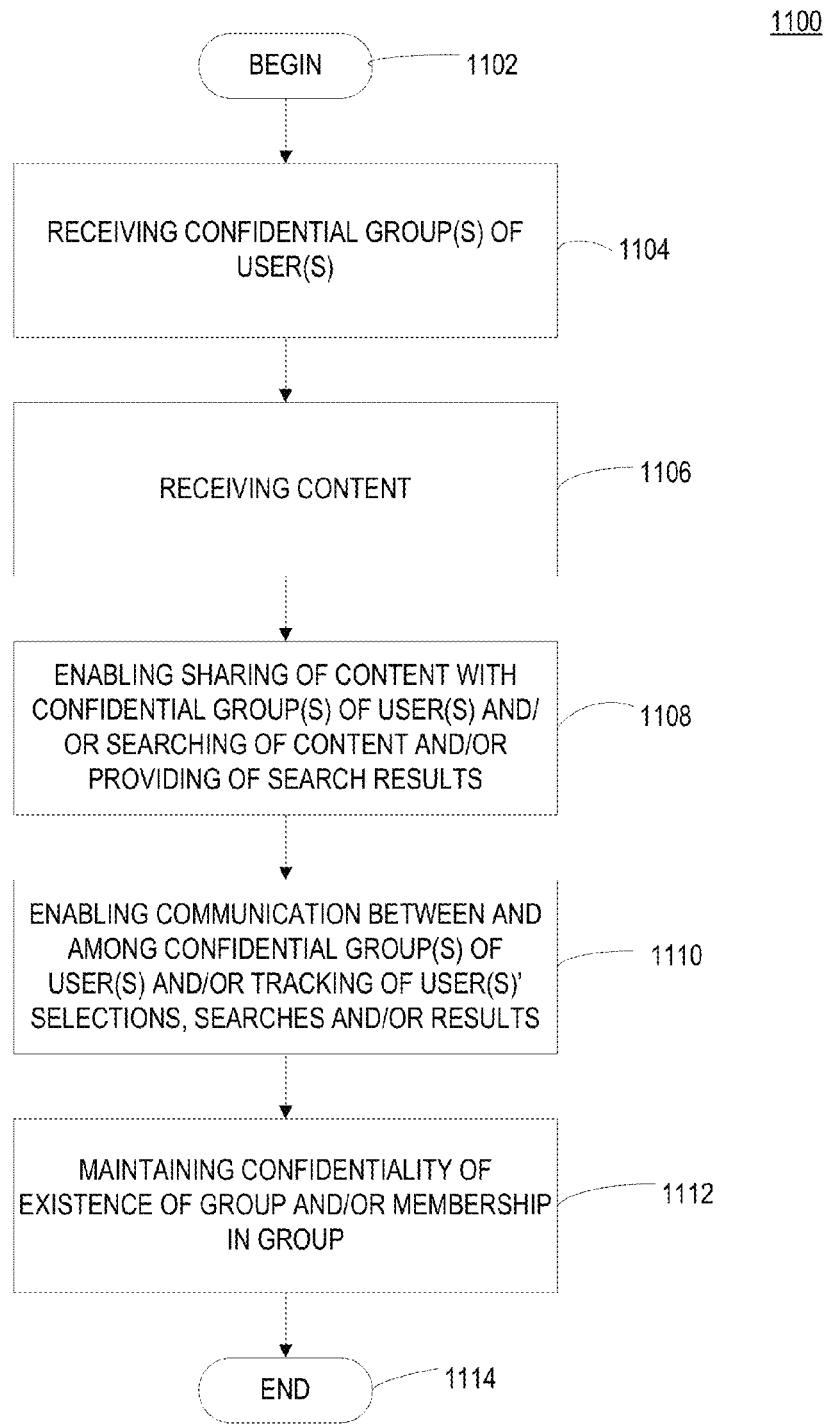
FIG. 11 illustrates an exemplary flow diagram of an exemplary confidential social platform embodiment as may be created by an exemplary system and may allow output, and/or display for interactive user viewing/access, and/or use, and/or provide, as a user interface, for an exemplary application program and/or system for providing a confidential social platform according to exemplary embodiments of the present invention, wherein the exemplary flow diagram may be used to, e.g., but not limited to, create, generate, share, communicate, maintain, modify, store, output, and/or display and provide for interactive access, an exemplary confidential social platform, which may include, in an exemplary embodiment, a system providing exemplary social networking functionality, according to an exemplary embodiment.

FIG. 11 illustrates an exemplary flow diagram 1100 as may be created by an exemplary system and may output and/or display for interactive user viewing/access and provide and/or use as a user interface, for an exemplary application program and/or system for providing a confidential social platform according to exemplary embodiments of the present invention. According to an exemplary embodiment, the exemplary flow diagram may create, generate, store, maintain, modify, communicate, output, display and/or provide for interactive access, an exemplary confidential social platform, which may include, in an exemplary embodiment, a system providing exemplary social networking functionality, according to an exemplary embodiment.

Flow diagram 1100 may begin with 1102 and may continue immediately with 1104.

In 1104, the processor may receive a confidential group of one or more user(s). An exemplary confidential social platform may be made available in an exemplary embodiment to, e.g., but not limited to, institutional users and/or trade associations, etc. From 1104, 1100 may continue with 1106.

In 1106, content may be received by the processor from one or more members of the confidential group of users. From 1106, 1100 may continue with 1108.

In 1108, an exemplary system may allow users to select confidential groups of individual(s) with, e.g., but not limited to, the same corporate group with whom to share/discuss/etc. documents and/or search results contained within the platform, according to an exemplary embodiment. In 1110, the user's selections may be tracked and/or provided to users for access. According to an exemplary embodiment, users in a group may be permitted to collaborate and communicate with one another. Activity may be tracked. For example, searches, selections and/or search results may be shared with others. From 1110, 1100 may continue with 1112.

In 1112, in an exemplary embodiment, existence of collaboration group(s) and/or membership of a given collaboration group(s) may not be disclosed to other platform users, according to an exemplary embodiment. From 1112, 1100 may continue with 1114, in which flow diagram 1100 may immediately end, in an exemplary embodiment.

Figure 12:
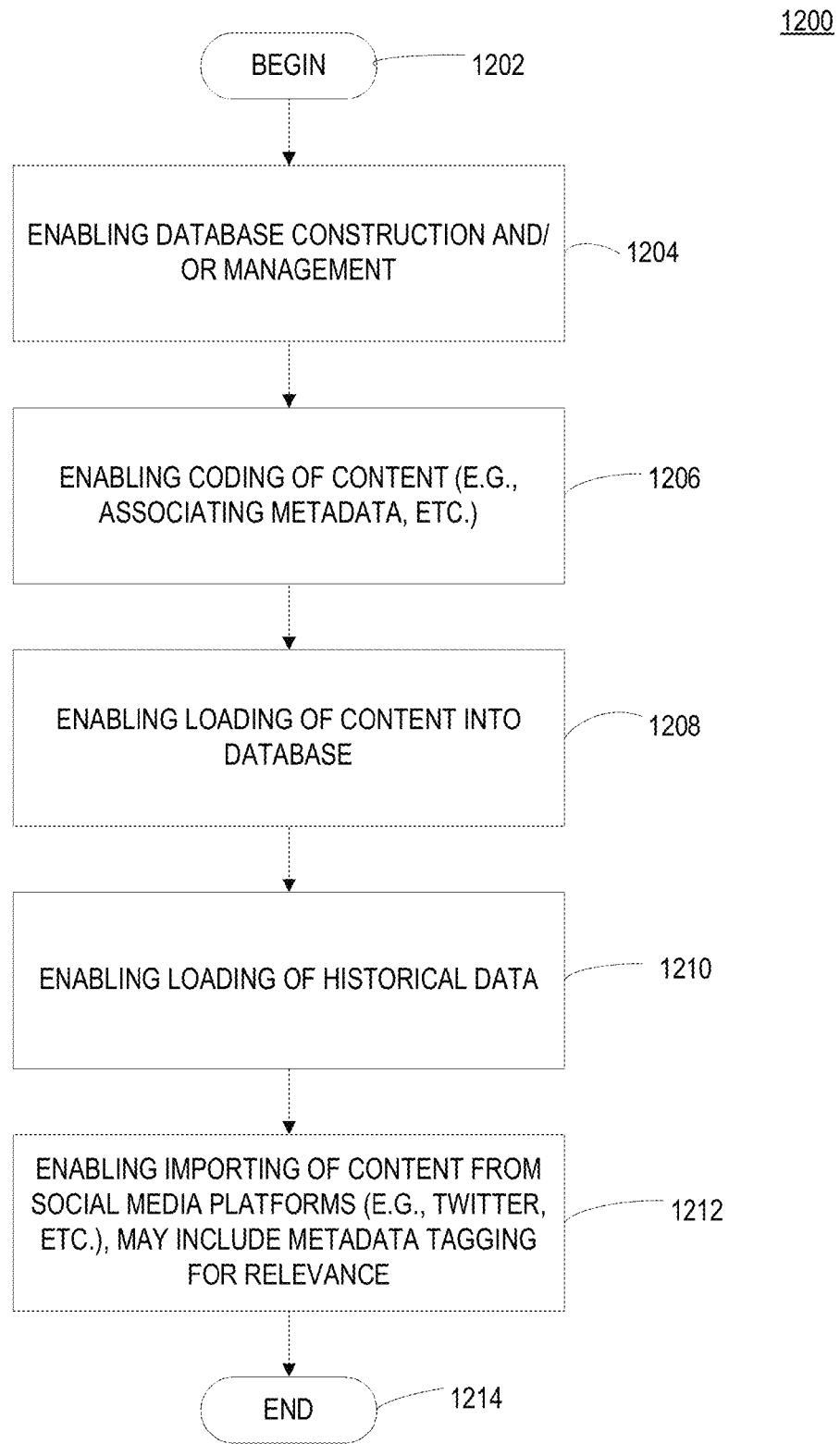
FIG. 12 illustrates an exemplary flow diagram of an exemplary database construction and/or management process as may be created by an exemplary system and may output and/or display for interactive user viewing/access, and/or use, and/or provide, as a user interface (UI), for an exemplary application program and/or system for providing an exemplary database, and system for constructing such a database according to exemplary embodiments of the present invention, wherein according to an exemplary embodiment, the exemplary flow diagram may be used to, e.g., but not limited to, create, generate, maintain, share, communicate, modify, store, output, display and/or provide for interactive access, an exemplary database construction methodology, which may include, in an exemplary embodiment, a system for constructing an exemplary database, according to an exemplary embodiment.

FIG. 12 illustrates an exemplary flow diagram 1200, according to an exemplary embodiment, as may be created by an exemplary system and may, e.g., output and/or display for interactive user viewing/access and use as a user interface, for an exemplary application program and/or system for providing an exemplary database, and system for constructing such a database according to exemplary embodiments of the present invention. According to an exemplary embodiment, the exemplary flow diagram 1200 may, e.g., generate, create, store, maintain, modify, communicate, output, display and/or provide for interactive access, an exemplary database construction methodology, which may include, in an exemplary embodiment, a system for constructing an exemplary database, according to an exemplary embodiment.

Flow diagram 1200 may begin with 1202 and may continue with 1204.

In 1204, the processor(s) may enable construction and/or management of a database. From 1204, 1200 may continue with 1206.

In 1206, edited content may be coded, e.g., but not limited to, using metadata or other tagging, including (e.g., a user using a tagging application to tag content) for, e.g., but not limited to, concepts. In an exemplary embodiment, metadata or tags may be associated with content to identify, e.g., concepts associated with the content. In an exemplary embodiment, tagging may be automated, semiautomated, or user interactive. From 1206, 1200 may continue with 1208.

In 1208, e.g., any and/or all content (e.g., PDFs, etc.) may be loaded into an exemplary database. Content may include, e.g., but not limited to, publicly available materials for which no copyright authorization is required, such as, e.g., but not limited to, G20 communiqués; IMF research; Basel Committee proposals; regulatory proposals, etc. From 1208, 1200 may continue with 1210.

In 1210, in an exemplary embodiment, historical data may be loaded, as well as new content. In an exemplary embodiment of the database, on some issues, content may extend back to earlier dates, such as, e.g., but not limited to, 1973, or earlier, etc., in an exemplary embodiment. From 1210, 1200 may continue with 1212.

In 1212, according to an exemplary embodiment, content may be imported into the exemplary database from other sources. For example, but not limited to, exemplary news stories shared on a social platform such as, e.g., but not limited to, Twitter, etc., may be incorporated/imported into the exemplary database, according to an exemplary embodiment, such content may be added only after meta-data or other tagging for relevance, according to an exemplary embodiment.

From 1212, flow diagram 1200 may continue with 1214, after which, in an exemplary embodiment, flow diagram 1200 may end.

Figure 13:
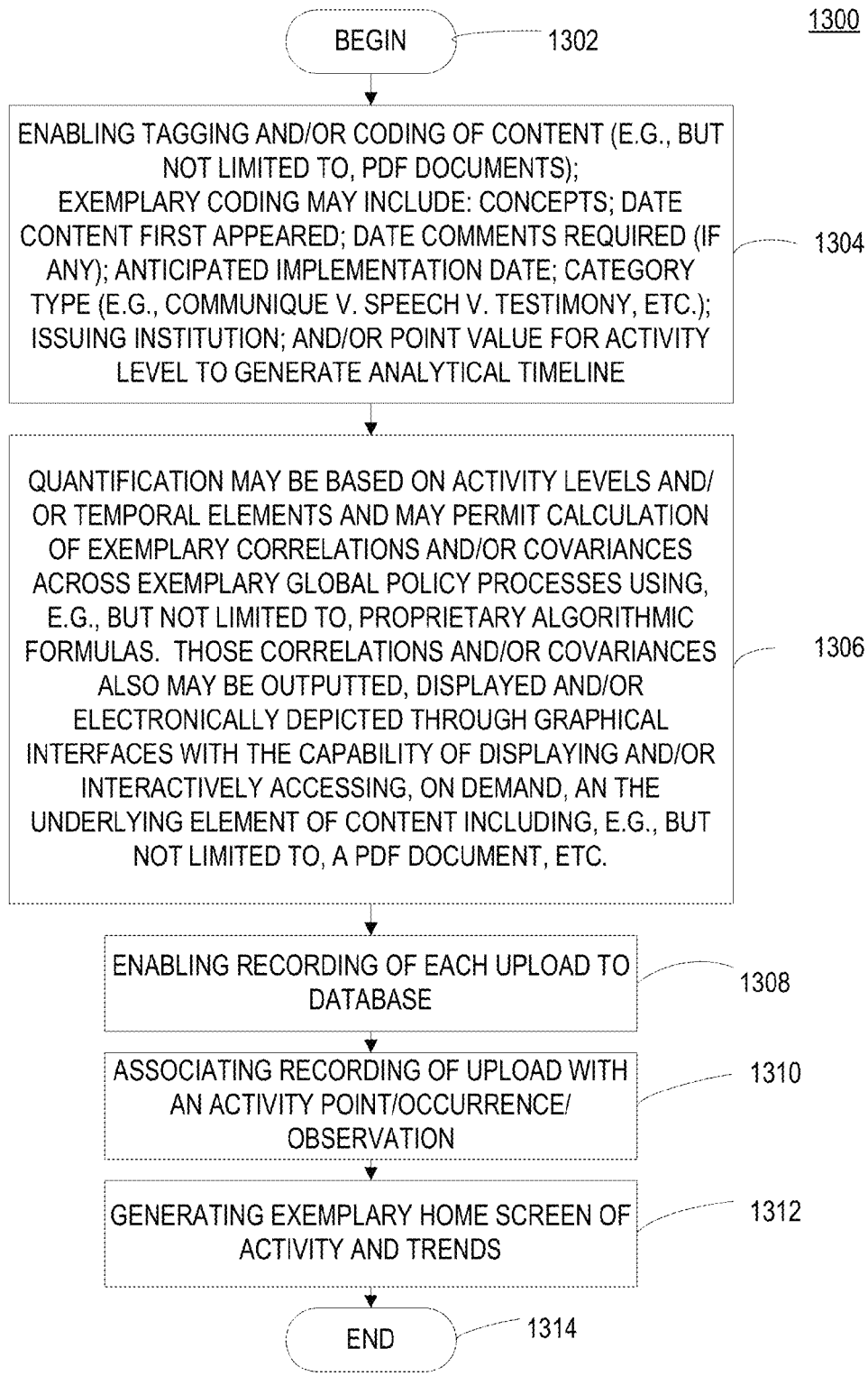
FIG. 13 illustrates an exemplary flow diagram of an exemplary system structure/information hierarchy as may be created by an exemplary system and may output and/or display for interactive user viewing/access, and/or use, and/or provide, as a user interface (UI), for an exemplary application program and/or system for providing an system structure/information hierarchy, and system according to exemplary embodiments of the present invention, wherein according to an exemplary embodiment, the exemplary flow diagram may but used to, e.g., but not limited to, create, generate, story, maintain, modify, communicate, output, display and/or provide for interactive access, an exemplary system structure/information hierarchy, according to an exemplary embodiment.

FIG. 13 illustrates an exemplary flow diagram 1300 as may be created by an exemplary system and may output and/or display one or more activity points/occurrences/observations/categories for interactive user viewing/access and use, or provide, as a user interface, for an exemplary application program and/or system for providing an system structure/information hierarchy, and system according to exemplary embodiments of the present invention. According to an exemplary embodiment, the exemplary flow diagram 1300 may create, store, maintain, modify, communicate, output, display, and/or provide for interactive access, an exemplary system structure/information hierarchy, according to an exemplary embodiment.

Flow diagram 1300 may begin with 1302 and may continue with 1304.

In 1304, in an exemplary embodiment, each occurrence/observation of content (e.g., PDF, etc.) may be tagged, and/or coded (e.g., a user may use a client to code a document with metadata, a metatag, etc.). Exemplary coding may include, e.g., but not limited to, i) concepts; ii) date it appeared; iii) date comments required, if any; iv) anticipated implementation date; v) category type (e.g., communiqué v. speech v. testimony, etc.); vi) issuing institution; and/or vii) point value for activity level to generate an analytical timeline, etc., by use of the exemplary system. From 1304, flow diagram may continue with 1306.

It is important to note that although various steps may be noted throughout this document, in a sequential manner, there is no requirement of a sequence, and indeed various elements of flow diagrams may be performed/executed in parallel, and/or in reverse and/or random order. Flow diagrams are described in sequence for convenience of review, but should not be limited to the sequence listed. Also, various steps of flow diagrams may be optional, and no flow diagram is required to include all steps as illustrated in the exemplary embodiments.

In 1306, according to an exemplary embodiment, quantification may be performed, e.g., quantification may be based on exemplary activity levels and/or temporal elements and/or concept and/or inter-linked cross-border public policy processes and may permit calculation of exemplary correlations and/or covariances across exemplary global economic, financial, and/or regulatory policy processes using, e.g., but not limited to, proprietary algorithmic formulas. The correlations and/or covariances also may be outputted, displayed and/or electronically depicted through graphical interfaces with the capability of displaying and/or interactively accessing, on demand, an underlying element of content including, e.g., but not limited to, a PDF document, etc. From 1306, in an exemplary embodiment flow diagram 1300 may continue with 1308.

In 1308, in an exemplary embodiment, the system may record each upload to the exemplary database. In 1310, the recording of the upload may be associated with or tracked as an activity point. In an exemplary embodiment, in 1312, the activity points tracking occurrences/observations may be used to generate an exemplary home screen for a given user, such as, e.g., but not limited to, as described with reference to FIG. 4 above.

From 1312, flow diagram 1300 may continue with 1314, after which, in an exemplary embodiment, flow diagram 1300 may end.

CONCLUSION

In this document, the terms "computer program medium" and "computer readable medium" may be used to generally refer to media such as, e.g., but not limited to removable storage drive, a hard disk installed in hard disk drive, and signals, etc. These computer program products may provide software to computer system. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as, e.g., but not limited to, "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

While various embodiments of the present invention have been described above, it should be understood that they have been presented by way of example only, and not limitation. Thus, the breadth and scope of the present invention should not be limited by any of the above described exemplary embodiments, but should instead be defined only in accordance with the following claims and their equivalents.

What is claimed is:

1. A computer-implemented method comprising:
  translating official sector action non-quantitative text-based data into at least one quantitative risk management tool that electronically anticipates at least one trajectory of at least one official sector cross-border public policy data comprising:
  receiving electronically, by at least one computer processor, said official sector action non-quantitative text-based data relating to the at least one official sector cross-border public policy data;
  receiving electronically, by the at least one computer processor, at least one tag or code relating to said official sector action non quantitative text-based data, comprising:
    tagging at least one concept electronically, by the at least one computer processor, of said at least one official sector action activity of the at least one official sector cross-border public policy data, based on:
      identifying electronically, by the at least one computer processor, occurrence of a group of words appearing together indicative of a specific concept in said at least one official sector action activity;
  associating electronically, by the at least one computer processor, said official sector action non-quantitative text-based data with said at least one tag or code, and storing in an electronic computer database;
  processing electronically, by the at least one computer processor, an algorithmic calculation to obtain the at least one anticipated official sector cross-border public policy data, wherein said algorithmic calculation comprises:
    linking electronically, by the at least one computer processor, the at least one anticipated official sector cross-border public policy data with said official sector action non-quantitative text-based data and said electronic database;
    enabling electronically, by the at least one computer processor, a semantic search of said electronic database;
    extracting electronically, by the at least one computer processor, quantitative data of at least one official sector action activity of the at least one official sector cross-border public policy data from said electronic database, wherein said extracting electronically said quantitative data of said at least one official sector action activity of the at least one official sector cross-border public policy data comprises:
- identifying electronically, by the at least one computer processor, correlations or covariances between a plurality of said at least one official sector action activity of said at least one official sector cross-border public policy data;
- receiving electronically, by the at least one computer processor, said at least one tag or code, and said at least one concept;
- weighting electronically, by the at least one computer processor, said quantitative data of said at least one official sector action activity of the at least one official sector cross-border public policy data, based on:
  - said at least one tag or code, and said at least one concept;
  - a proximity of said at least one official sector action activity to a decision point; and
  - a relative importance of an activity level of said at least one official sector action activity; and
- anticipating electronically, by the at least one computer processor, the at least one trajectory of the at least one official sector cross-border public policy data of said at least one official sector cross-border public policy based on:
  - said at least one tag or code, and said at least one concept;
  - said identifying electronically of said correlations or covariances, and
  - said weighting electronically based on:
    - said proximity to the deadline, and
    - said relative importance of said activity level; and
- generating, by the at least one computer processor, at least one graphical representation of said quantitative data and the anticipated at least one trajectory of the at least one official sector cross-border public policy.

2. The method according to claim 1, further comprising:
- receiving, by the at least one computer processor, a query regarding said official sector action non-quantitative text-based data;
- searching, by the at least one computer processor, said database based on said query;
- providing, by the at least one computer processor, at least one search result of said official sector action non-quantitative text-based data made accessible through visual representations using at least one graphical display interface identifying, by the at least one computer processor, at least one anticipated potential correlation or covariance among a plurality of quantified cross-border policy processes; and
- determining, by the at least one computer processor, said at least one policy correlation, covariance, or trajectory trend projection.

3. The method according to claim 2, wherein said receiving said query comprises at least one of:
- receiving, by the at least one computer processor, a web based query; or
- receiving, by the at least one computer processor, a selection by a user of a portion of a graphical user interface.

4. The method according to claim 2, wherein said providing said search results comprises:
- generating, by the at least one computer processor, at least one customized graph.

5. The method according to claim 4, wherein said generating said at least one customized graph comprises generating at least one visual analytical graph depicting at least one identified or projected official sector policy trajectory, correlation, covariance, and overlap, said method comprising at least one of:
- generating, by the at least one computer processor, at least one customized bar graph;
- generating, by the at least one computer processor, at least one customized pie chart graph;
- generating, by the at least one computer processor, at least one Venn diagram;
- generating, by the at least one computer processor, a chart;
- generating, by the at least one computer processor, at least one line graph or time series, pairing important policy-making meetings with selected issue-specific at least one of: regulatory policy processes, related research, or speeches;
- generating, by the at least one computer processor, at least one customized relationship map graph;
- generating, by the at least one computer processor, at least one customized graph comprising a plurality of portions, wherein each of said plurality of portions is hyperlinked to said official sector action non-quantitative text-based data; or
- generating, by the at least one computer processor, at least one customized graph comprising a plurality of at least one of: segments, bars, regions, areas, or lines,
  - wherein each of said plurality of said segments, bars, regions, areas, or lines are hyperlinked to said official sector action non-quantitative text-based data.

6. The method according to claim 2, wherein said providing said search results of said official sector action non-quantitative text-based data, comprises:
- providing, by the at least one computer processor, said search results of said official sector action non-quantitative text-based data displayed in said graphical, quantitative manner, at least one of:
  - at least once per day; or
  - on a periodic basis.

7. The method according to claim 1, wherein said receiving said official sector action non-quantitative text-based data comprises at least one of:
- receiving and storing, by the at least one computer processor, a portable document format (pdf) document or other document issued by an official sector entity in a non-editable format;
- receiving, by the at least one computer processor, a communiqué document;
- receiving, by the at least one computer processor, a publicly available draft legislation document;
- receiving, by the at least one computer processor, a final legislation document;
- receiving, by the at least one computer processor, a publicly available draft regulation document;
- receiving, by the at least one computer processor, a publicly available official sector research document issued by a national, supranational, or international official sector entity;
- receiving, by the at least one computer processor, a publicly available document or testimony submitted to a national or supranational legislative, parliamentary, or regulatory body;
- receiving, by the at least one computer processor, news items and other information shared publicly and voluntarily by the publishing entity through at least one social media or publication platform; or receiving, by the at least one computer processor, information shared publicly by the publishing official sector entity or by a media company on at least one social media platform.

8. The method according to claim 1, further comprising at least one secure, confidential computer processor identifying at least one cross-border policy trajectory projection using said graphical representation tools to a set of users.

9. The method according to claim 1, wherein said receiving said at least one tag comprises assigning a number value that translates qualitative data comprising at least one of a concept, type, date of action, or official sector entity name, into a machine-readable quantitative element capable of being analyzed to identify at least one of a correlation or a covariance on a cross-border basis.

10. The method according to claim 1, wherein said receiving at least one tag or code comprises at least one of:
   receiving, by the at least one computer processor, at least one tag or code for at least one concept;
   receiving, by the at least one computer processor, at least one tag or code of at least one pre-determined issue of interest;
   receiving, by the at least one computer processor, at least one tag or code for at least one implementation date, or at least one date by which a comment is due, if any;
   receiving, by the at least one computer processor, at least one tag or code for at least one issuance date;
   receiving, by the at least one computer processor, at least one tag or code for at least one category type;
   receiving, by the at least one computer processor, at least one tag or code for at least one issuing institution; or
   receiving, by the at least one computer processor, at least one tag or code for at least one point value for an official sector action activity level.

11. The method according to claim 1, further comprising:
   generating, by the at least one computer processor, an analytical timeline pairing cross-border or national policymaking meetings with specific rule-making processes for at least one of:
      individual issues in any jurisdiction covered by the system;
      maturity structures; or
      expiration dates for a user's financial contracts.

12. The method, according to claim 1, further comprising:
   receiving, by the at least one computer processor, a search query based on at least one official sector institution; and
   providing, by the at least one computer processor, at least one set of at least one quantitative cross-border analysis and at least one anticipated policy trajectory and weighting.

13. The method, according to claim 1, wherein the official sector cross-border public policy data relates to at least one policy comprising at least one of:
   regulatory policy;
   financial regulatory policy;
   economic policy;
   trade policy;
   health policy;
   agriculture policy;
   development policy; or
   intellectual property rights policy.

14. The method according to claim 1, wherein said at least one official sector action activity of said at least one official sector cross-border public policy comprises:

making or publishing of at least one publicly available document at least one of:
   official sector speech PDF,
   official sector speech activity,
   official sector speech document,
   official sector statement or decision appearing in publicly available news media,
   official sector draft regulation,
   official sector final regulation,
   official sector draft legislation,
   official sector final legislation,
   official sector parliamentary hearing,
   official sector research,
   IMF research,
   BIS research,
   Central Bank research,
   an official sector decision reported by publicly available media or broadcast publicly over airwaves or internet broadcast,
   official sector research activity,
   official sector communiqué,
   news report regarding official sector action,
   text issued by a government,
   research document issued by at least one of:
      a government ministry,
      an international institution, or
      a policymaker,
   official sector communication, or
   testimony or official statement submitted to at least one of:
      a national, or
      supranational,
         legislative,
         parliamentary, or
         regulatory body,
by at least one official sector entity, or representative of the at least one other official sector entity.

15. The method according to claim 14, wherein the at least one official sector entity comprises at least one of:
   at least one government;
   at least one official sector international organization; or
   at least one official sector supranational organization.

16. The method according to claim 1, further comprising:
   providing at least one point value or at least one weighting based on a type of said at least one official sector action activity of said at least one cross-border policy action.

17. The method according to claim 1, further comprising at least one of:
   capturing at least one cross-border correlation between at least two of said at least one activities; or
   capturing at least one cross-border policy covariance of at least two of said at least one activities.

18. The method according to claim 1, wherein said graphical representation comprises at least one of:
   a pie chart;
   a line chart,
   a timeline;
   a relationship map;
   a relationship chart;
   a decision-point chart;
   a Venn diagram; or
   an interactive visual analytical graph.

19. The method according to claim 1, further comprising at least one of:
   wherein said providing comprises at least one of:
      providing as part of a social platform and at least one of:

providing at least one indication of at least one user interaction with respect to at least one of said predetermined cross-border policy; or
providing at least one social platform comprising:
facilitating at least one of:
user access,
tracking parallel issues,
tracking trending issues,
tracking selected issues,
tracking strategic issues,
tracking issues, or
user collaboration.

20. The method according to claim 1, wherein said extracting electronically of said quantitative data of said at least one official sector action activity comprises at least one of:
receiving or generating, by the at least one computer processor, tagging, coding, or weighting of said at least one official sector action activity based on at least one of:
an anticipated implementation date of at least one of:
at least one regulation, or
at least one legislation;
date of creation of said at least one official sector action activity;
date of appearance of said at least one official sector action activity;
date comments required of said at least one official sector action activity;
anticipated implementation date of said at least one official sector action activity;
issuing institution of said at least one official sector action activity; or
type of said at least one official sector action activity.

21. The method according to claim 1, further comprising:
determining and demonstrating connections among conceptual issues;
tracking key dates comprising at least one of:
historical dates,
current dates, or
future dates;
supporting internal strategic decision-making in relation to quantified political risk; and
supporting scenario analysis.

22. The method according to claim 1, wherein said extracting, by the at least one computer processor, of said quantitative data of said official sector action activity of said at least one official sector cross-border public policy data from said official sector action non-quantitative text-based data, comprises:
assigning a quantitative value or a numerical value regarding official sector activity levels for at least one of an observation, or an occurrence;
aggregating said official sector action activity level over a time period;
weighting said official sector action activity level based on an official sector action activity type; and
providing analytics regarding said extracted, aggregated, and weighted official sector action activity data in order to anticipate future likely policy trajectories.

23. The method according to claim 1, further comprising at least one of:
tracking, by the at least one computer processor, a plurality of policy issues in parallel;
tracking, by the at least one computer processor, at least one issue trending on a policy tracking platform;
tracking, by the at least one computer processor, aggregated official sector action activity levels over a time period;
tracking, by the at least one computer processor, a most selected policy issue; or
tracking, by the at least one computer processor, a most active policy issue.

24. The method according to claim 1, comprises:
meta-data tagging, by the at least one computer processor, said at least one official sector action activity of said official sector action non-quantitative text-based data with tags comprising:
an issuing entity,
a date issued,
a document type,
a date comments are due, if any, and
a concept; and
wherein said at least one official sector action activity comprises
an observation, or
occurrence,
said observation or occurrence comprising at least one of:
an official sector policy research paper,
an official sector policy hearing, or
an official sector policy speech,
to create the electronic database,
wherein the electronic database comprises:
a customized, edited concept-based database configured to deliver analytical content automatically;
identifying, by the at least one computer processor, quantitative measures by semantic analysis of said official sector action non-quantitative text-based data;
enabling electronic searching, by the at least one computer processor, of the customized, edited concept-based database;
computing, by the at least one computer processor, volumes of a plurality of activity types;
computing, by the at least one computer processor, an activity level for an issue of interest for a given time period by coding a point value for said activity level;
generating, by the at least one computer processor, an analytical timeline by charting decision points;
enabling generating, by the at least one computer processor, of customized electronic quantitative graphs and customized electronic quantitative timelines from data in the customized, edited concept-based database;
incorporating, by the at least one computer processor, at least one social media solution providing insight into which issues in the customized, edited concept-based database are "trending"; and
providing capacity, by the at least one computer processor, for secure, confidential electronic collaboration among corporate and trade association teams.

25. The method according to claim 1, wherein said tagging and weighting are not user adjustable.

26. The method according to claim 1, further comprising:
a user interface control limited to performing queries and configured to receive user selection of preferred display format for query results.

27. The method according to claim 1, wherein said translating said official sector action non-quantitative text-based data into at least one quantitative risk management tool that electronically anticipates said at least one trajectory of said at least one official sector cross-border public policy data comprises:
translating only said official sector action non-quantitative text-based data.

28. The method according to claim 1, wherein said at least one correlation is a correlation in time and not consensus.

29. An electronic computer implemented data processing system comprising:
at least one computer memory; and
at least one computer processor, coupled to said at least one memory,
said at least one computer processor adapted to translate official sector action non-quantitative text-based data into at least one quantitative risk management tool that anticipated at least one trajectory of at least one official sector cross-border public policy data comprising:
wherein the at least one computer processor coupled to the at least one computer memory, is configured to
convert official sector action non-quantitative text-based data relating to at least one action of the at least one official sector cross-border public policy data into quantitative components;
wherein said processor is configured to:
receive at least one tag or code relating to said official sector action non-quantitative text-based data, comprising:
wherein said processor is configured to:
receive at least one concept tag of said at least one official sector action activity of the at least one official sector cross-border public policy data based on:
wherein said processor is configured to identify occurrence of a group of words appearing together indicative of a specific concept in said at least one official sector action activity;
associate said official sector action non-quantitative text-based data with said at least one tag to obtain tagged official sector action non-quantitative data in a computer database,
extract quantitative data of at least one official sector action activity of the at least one official action cross-border public policy data from said tagged official sector action non-quantitative data,
wherein said extract said quantitative data of said at least one official sector action activity of the at least one official sector cross-border public policy data comprising said at least one computer process configured to
electronically identify a recognized correlation or covariance among a plurality of said actions of the at least one cross-border public policy data;
receive electronically said at least one tag or code, and said at least one concept;
weight electronically said quantitative data of said at least one official sector action activity of the at least one official sector cross-border public policy data, based on:
said at least one tag or code, and said at least one concept;
a proximity of said at least one official sector action activity to a decision point; and
a relative importance of an activity level of said at least one official sector action activity; and
anticipate at least one policy trajectory of the at least one official sector cross-border public policy data of said at least one official sector cross-border public policy based on:
said at least one tag or code, and said at least one concept;
said identifying electronically of said correlations or covariances, and
said weighting electronically based on:
said proximity to the deadline, and
said relative importance of said activity level; and
generate at least one graphical representation of said quantitative data and the anticipated at least one trajectory of the at least one official sector cross-border public policy data of said at least one official sector cross-border public policy; and
provide the at least one quantitative anticipatory risk management tool comprising said at least one computer processor being configured to at least one of:
provide said at least one graphical representation of said quantitative data of said at least one official sector action activity of the at least one official sector cross-border public policy data of said at least one official sector cross-border public policy;
provide graphical or numerical official sector action activity-based search results sorted by at least one of: activity type, institution type, or concept type; or
provide access to at least one underlying document upon request.

30. A nontransitory computer program product embodied on at least one nontransitory computer readable medium comprising program logic, which when executed on at least one processor, performs a method for translating official sector action non-quantitative text-based data into at least one quantitative risk management tool that electronically anticipates at least one trajectory of at least one official sector cross-border public policy data comprising:
receiving, by at least one computer processor, said official sector action non-quantitative text-based data relating to the at least one official sector cross-border public policy data;
receiving, by the at least one computer processor, at least one tag or code relating to said official sector action non-quantitative text-based data, comprising:
tagging at least one concept electronically, by the at least one computer processor, of said at least one official sector action activity of the at least one official sector cross-border public policy data, based on:
identifying electronically, by the at least one computer processor, occurrence of a group of words appearing together indicative of a specific concept in said at least one official sector action activity;
associating, by the at least one computer processor, said official sector action non-quantitative text-based data with said at least one tag or code, and storing in an electronic computer database;
extracting in response to queries, by the at least one computer processor, quantitative data of at least one official sector action activity level of the at least one official sector cross-border public policy data from tagged official sector action non-quantitative data,
wherein said extracting said quantitative data of said at least one official sector action activity of the at least one official sector cross-border public policy data comprises:
identifying, by the at least one computer processor, a correlation or covariance among a plurality of said at least one official sector action activity of the at least one official sector cross-border public policy data;

receiving electronically, by the at least one computer processor, said at least one tag or code, and said at least one concept;

weighting electronically, by the at least one computer processor, said quantitative data of said at least one official sector action activity of the at least one official sector cross-border public policy data, based on:

said at least one tag or code, and said at least one concept;

a proximity of said at least one official sector action activity to a decision point; and a relative importance of an activity level of said at least one official sector action activity; and anticipating, by the at least one computer processor, the at least one trajectory of the at least one official sector cross-border public policy data of said at least one official sector cross-border public policy based on:

said at least one tag or code, and said at least one concept;

said identifying electronically of said correlations or covariances, and said weighting electronically based on:

said proximity to the deadline, and said relative importance of said activity level; and generating, by the at least one computer processor, at least one graphical representation of said quantitative data and the anticipated at least one trajectory of the at least one official sector cross-border public policy data;

providing, by the at least one computer processor, the at least one quantitative risk management tool; and providing to users, by the at least one computer processor, access to said official sector action non-quantitative text-based data comprising at least one textual document.

31. A method comprising:

a computer implemented method of providing quantitative risk management information comprising:

receiving, by at least one computer processor, a query regarding official sector action non-quantitative text-based data;

searching, by the at least one computer processor, an electronic database based on said query, wherein said electronic database comprises:

extracted or assigned numerical data of, at least one official sector action activity level of at least one predetermined issue of interest comprising at least one of an observation, or an occurrence, said extracted numerical data, which quantifies at least one official sector cross-border public policy process by said at least one official sector action activity level, wherein said extracted numerical data, of said quantitative data of said official sector action activity of said at least one official sector cross-border public policy data form said official sector action non-quantitative text-based data comprises:

assigning a quantitative value or a numerical value regarding official sector action activity levels for at least one of an observation, or an occurrence, comprising:

receiving electronically, by the at least one computer processor, at least one tag or code relating to said official sector action non-quantitative text-based data, comprising:

tagging at least one concept electronically, by the at least one computer processor, of said at least one official sector action activity of the at least one official sector cross-border public policy data, based on:

identifying electronically, by the at least one computer processor, occurrence of a group of words appearing together indicative of a specific concept in said at least one official sector action activity;

associating electronically, by the at least one computer processor, said official sector action non-quantitative text-based data with said at least one tag or code, and storing in an electronic computer database;

aggregating said official sector action activity level over a time period;

weighting said official sector action activity level based on an activity type; and providing analytics regarding said extracted, aggregated, and weighted activity data in order to anticipate future likely policy trajectories;

aggregated numerical data of said at least one official sector action activity level over a time period;

anticipated correlation or covariances among a plurality of said at least one official sector action activity level for said at least one official sector cross-border public policy process;

receiving electronically, by the at least one computer processor, said at least one tag or code, and said at least one concept;

weighting electronically, by the at least one computer processor, said quantitative data of said at least one official sector action activity of the at least one official sector cross-border public policy data, based on:

said at least one tag or code, and said at least one concept;

a proximity of said at least one official sector action activity to a decision point; and a relative importance of an activity level of said at least one official sector action activity; and at least one anticipated policy trajectory of said at least one predetermined issue of interest determined based on:

said extracted and aggregated numerical data;

said identified correlation or covariances;

said at least one tag or code, and said at least one concept;

said identifying electronically of said correlations or covariances, and said weighting electronically based on:

said proximity to the deadline, and said relative importance of said activity level; and providing, by the at least one computer processor, at least one search result of official sector action non-quantitative text-based data by making accessible via at least one interactive electronic graphical display interface comprising at least one quantified forward-looking policy trajectory projection of said at least one predetermined issue of interest with access to underlying official sector action non-quantitative text-based data.

* * * * *